United States Patent
El-Kady et al.

(10) Patent No.: US 11,495,828 B2
(45) Date of Patent: Nov. 8, 2022

(54) NON-FLAMMABLE ELECTROLYTE FOR ENERGY STORAGE DEVICES

(71) Applicants: Silq Technologies Corporation, Los Angeles, CA (US); The Regents of the University of California, Oakland, CA (US)

(72) Inventors: Maher F. El-Kady, Los Angeles, CA (US); Brian T. McVerry, Los Angeles, CA (US); Ethan Rao, Venice, CA (US); Richard B. Kaner, Pacific Palisades, CA (US)

(73) Assignees: Silq Technologies Corporation, Los Angeles, CA (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 17/472,087

(22) Filed: Sep. 10, 2021

(65) Prior Publication Data
US 2022/0077496 A1    Mar. 10, 2022

Related U.S. Application Data

(60) Provisional application No. 63/076,902, filed on Sep. 10, 2020.

(51) Int. Cl.
| | |
|---|---|
| *H01M 10/0565* | (2010.01) |
| *H01M 10/0525* | (2010.01) |
| *H01M 4/04* | (2006.01) |
| *H01M 4/131* | (2010.01) |
| *H01M 4/1391* | (2010.01) |
| *H01M 4/1393* | (2010.01) |
| *H01M 4/133* | (2010.01) |

(52) U.S. Cl.
CPC ..... *H01M 10/0565* (2013.01); *H01M 4/0416* (2013.01); *H01M 4/131* (2013.01); *H01M 4/133* (2013.01); *H01M 4/1391* (2013.01); *H01M 4/1393* (2013.01); *H01M 10/0525* (2013.01); *H01M 2220/20* (2013.01); *H01M 2300/008* (2013.01); *H01M 2300/0051* (2013.01)

(58) Field of Classification Search
None
See application file for complete search history.

(56) References Cited

U.S. PATENT DOCUMENTS

| | | | | |
|---|---|---|---|---|
| 6,045,951 | A  * | 4/2000 | Wendsjo | H01M 10/0569 429/317 |
| 2002/0086216 | A1* | 7/2002 | Sekino | H01M 10/0431 429/332 |
| 2003/0194557 | A1 | 10/2003 | Wilde et al. | |
| 2006/0204857 | A1 | 9/2006 | Kejha et al. | |
| 2008/0076030 | A1* | 3/2008 | Inagaki | H01M 10/0567 429/337 |
| 2008/0274398 | A1* | 11/2008 | Kim | H01M 50/463 429/129 |
| 2010/0028783 | A1 | 2/2010 | Nah | |
| 2017/0062819 | A1* | 3/2017 | Ikenuma | H01M 4/0471 |
| 2019/0198932 | A1* | 6/2019 | Newhouse | H01M 10/052 |

OTHER PUBLICATIONS

C.H. Chen, J. Liu, M.E. Stoll, G. Henriksen, D.R. Vissers, K. Amine. Aluminum-doped lithium nickel cobalt oxide electrodes for high-power lithium-ion batteries, Journal of Power Sources 128 (2004) 278-285.*
J.A. Gilbert, J. Bareno, T. Spila, S.E. Trask, D.J. Miller, B.J. Polzin, A.N. Jansen, D.P. Abraham. Cycling Behavior of NCM523/Graphite Lithium-Ion Cells in the 3-4.4 V Range: Diagnostic Studies of Full Cells and Harvested Electrodes, Journal of The Electrochemical Society, 164 (1) A6054-A6065 (2017).*
D. Chao, L. Wang, W. Shen, S. Guo.Effects of the lateral sizes and basal plane structure of graphene on the electrochemical properties of LiCoO2, Journal of Alloys and Compounds 785 (2019) 557-562.*
P. Shi, S. Fang, J. Huang, D. Luo, L. Yang, S.-I. Hirano. A novel mixture of lithium bis(oxalato)borate, gamma-butyrolactone and non-flammable hydrofluoroether as a safe electrolyte for advanced lithium ion batteries, J. Mater. Chem. A, 2017, 5, 19982.*
PCT/US2021/049837 International Search Report and Written Opinion dated Feb. 14, 2022.
PCT/US2021/049837 Invitation to Pay Additional Fees dated Nov. 18, 2021.

* cited by examiner

*Primary Examiner* — Carlos Barcena
(74) *Attorney, Agent, or Firm* — Wilson Sonsini Goodrich & Rosati

(57) ABSTRACT

Provided herein are energy storage devices high energy and power densities, cycle life, and safety. In some embodiments, the energy storage device comprise a non-flammable electrolyte that eliminate and/or reduce fire hazards for improved battery safety, with improved electrode compatibility with electrode materials.

20 Claims, 6 Drawing Sheets

NON-FLAMMABLE ELECTROLYTE FOR ENERGY STORAGE DEVICES

CROSS-REFERENCE

This application claims the benefit of U.S. Provisional Application No. 63/076,902, filed Sep. 10, 2020, which is hereby incorporated by reference in its entirety herein.

BACKGROUND

There is currently an unmet need for safe energy storage technologies with high energy and power densities. While Lithium-ion (Li-ion) batteries are currently employed to power personal electronics and electric vehicles to power tools and even space missions, carbonate electrolytes currently used in commercial Li ion batteries are flammable and thus pose a significant fire hazard. Such lithium ion batteries, if shorted, could ignite and may be nearly impossible to extinguish using conventional techniques.

Although numerous solvents such as ionic liquids, fluoroethers, organosilicon compounds and organophosphate compounds have been tested as non-flammable replacements to such flammable carbonate electrolytes, energy storage devices with such materials suffer lower energy and power densities, as the solvents are incompatible with electrode materials such as graphene due to the strong catalytic activity therein.

SUMMARY

In one aspect, disclosed herein is a lithium ion energy storage device comprising: a cathode; an anode; and a fire resistant electrolyte comprising lactone. The energy storage devices disclosed herein have the advantage of being fire resistant, for example, as confirmed through nail penetration testing. In addition, the combination of the graphene or reduced graphene oxide materials used in the electrodes with the fire resistant electrolyte provides both superior performance such as high energy and power densities and resistance to igniting, which is especially valuable in the case of lithium ion batteries that are prone to overheating and combustion under certain conditions. These features make the energy storage device particularly suitable for use as batteries in energy intensive implementations such as in electric vehicles, although the advantages are applicable in various energy storage situations.

In some embodiments, the lactone is butyrolactone. In some embodiments, the butyrolactone is gamma-butyrolactone. In some embodiments, the fire-resistant electrolyte further comprises one or more of lithium bis(oxalato)borate (LiBOB), lithium tetrafluoroborate ($LiBF_4$), 1,3-Dioxol-2-one (VC) or 4-Vinyl-1,3-dioxolan-2-one (VEC), or 1,1,2,2-Tetrafluoroethyl-2,2,3,3-tetrafluoropropyl ether (FEP).

In some embodiments, a weight per weight (w/w) percentage of the gamma-butyrolactone in the fire-resistant electrolyte is about 30% to about 90%. In some embodiments, a w/w percentage of the 1,1,2,2-Tetrafluoroethyl-2,2,3,3-tetrafluoropropyl ether (FEP) in the fire-resistant electrolyte is about 5% to about 50%. In some embodiments, a w/w percentage of the lithium tetrafluoroborate (LiBF4) in the fire-resistant electrolyte is about 1% to about 20%. In some embodiments, a w/w percentage of the 1,3-Dioxol-2-one (VC) or 4-Vinyl-1,3-dioxolan-2-one (VEC) in the fire-resistant electrolyte is about 0.1% to about 10%. In some embodiments, a w/w percentage of the lithium bis(oxalato) borate (LiBOB) in the fire-resistant electrolyte is about 0.1% to about 10%.

In some embodiments, the anode comprises a graphite material prepared from a graphite powder. In some embodiments, the graphite powder comprises mesocarbon microbeads. In some embodiments, the mesocarbon microbeads, natural graphene, synthetic graphene, or any combination thereof have a diameter of about 5 microns to about 50 microns.

In some embodiments, the anode comprises graphite, carbon black, a hydrophilic binder, carboxymethyl cellulose, or any combination thereof. In some embodiments, the anode comprises one or more of about 70% to about 95% w/w graphite, about 1% to about 5% w/w carbon black, about 1% to about 5% w/w hydrophilic binder, or about 0.1% to about 5% w/w carboxymethyl cellulose.

In some embodiments, the anode comprises one or more of about 70% to about 95% w/w graphite, about 1% to about 5% w/w carbon black, about 1% to about 5% w/w hydrophilic binder, or about 0.1% to about 5% w/w carboxymethyl cellulose. In some embodiments, the anode comprises a w/w concentration of graphite of about 70% to about 95%. In some embodiments, the anode comprises a w/w concentration of carbon black of about 1% to about 5%. In some embodiments, the anode comprises a w/w concentration of the hydrophilic binder of about 1% to about 10%. In some embodiments, the anode comprises a w/w concentration of carboxymethyl cellulose of about 0.1% to about 5%.

In some embodiments, the hydrophilic binder comprises styrene butadiene rubber. In some embodiments, the cathode comprises lithium cobalt oxide. In some embodiments, the cathode comprises polyvinylidine fluoride (PVDF), carbon black, graphene, or any combination thereof. In some embodiments, the cathode comprises one or more of 70% to 99% w/w lithium cobalt oxide, about 0.5% to about 5% w/w polyvinylidine fluoride (PVDF), about 0.1% to about 5% w/w carbon black, or about 0.001% to about 5% w/w graphene.

In some embodiments, the cathode comprises one or more of 70% to 99% w/w lithium cobalt oxide, about 0.5% to about 5% w/w polyvinylidine fluoride (PVDF), about 0.1% to about 5% w/w carbon black, or about 0.001% to about 5% w/w graphene. In some embodiments, the cathode comprises a w/w concentration of lithium cobalt oxide of about 70% to about 99%. In some embodiments, the cathode comprises a w/w concentration of polyvinylidine fluoride (PVDF) of about 0.5% to about 5% w/w. In some embodiments, the cathode comprises a w/w concentration of carbon black of about 0.1% to about 5%. In some embodiments, the cathode comprises a w/w concentration of graphene of about 0.001% to about 5%. In some embodiments, the cathode has a w/w concentration of the lithium nickel cobalt aluminum oxide of from 30% to 90% w/w nickel:cobalt:aluminum oxide and from about 1% to about 15% lithium. In some embodiments, the cathode has a w/w concentration of the lithium nickel cobalt aluminum oxide of about 30% to about 90%. In some embodiments, the cathode has a w/w concentration of lithium of about 1% to about 15%.

In some embodiments, the cathode comprises a Ni:Co:Mn ratio of about 5:2:3. In some embodiments, the cathode comprises a Ni:Co:Mn ratio of about 5:2:3, 5:1:3, 5:3:3, 5:2:4, 5:1:4, 5:3:4, 4:2:3, 4:1:3, 4:3:3, 4:2:4, 4:1:4, 4:3:4, 6:2:3, 6:1:3, 6:3:3, 6:2:4, 6:1:4, or 6:3:4.

In some embodiments, the cathode has a specific capacity of at least about 50, 60, 70, 80, 90, 100, 110, 120, 130, 140, or 150 mAh/g. In some embodiments, the cathode has an areal capacity of at least about 1, 2, 3, 4, 5, or 6 mAh/cm$^2$. In some embodiments, the cathode has a loading mass of at least about 10, 15, 20, 25, 30, 35, or 40 mg/cm$^2$.

In some embodiments, the cathode has a porosity suitable for charge and discharge. In some embodiments, the cathode has packing density of about 2.0 g/cm$^3$ to about 5 g/cm$^3$. In some embodiments, the cathode has a packing density from about 1 to about 5 g/cm$^3$, from about 2 to about 4 g/cm$^3$, or from about 3.0 and about 3.6 g/cm$^3$. In some embodiments, the packing density of the cathode of about 2.0 g/cm$^3$ to about 5 g/cm$^3$ enables a sufficient porosity for charging and discharging.

Provided herein are methods of forming a mesocarbon microbead electrode. In some embodiments, the method comprises forming a mixture of mesocarbon microbeads (MCMB), carbon black, carboxymethyl cellulose (CMC), a hydrophilic binder, and water, and coating the mixture onto a substrate.

In some embodiments, the hydrophilic binder comprises styrene butadiene rubber (SBR), polyvinylidene fluoride (PVDF), sodium alginate, polytetrafluoroethylene (PTFE), sodium carboxymethyl chitosan (CCTS), polyacrylic acid (PAA), polystyrene sulfonate (PSS), polyvinyl alcohol (PVA), poly(fluorene), polyphenylene, polypyrene, polyazulene, polynaphthalene, poly(acetylene), poly(p-phenylene vinylene), poly(pyrrole) (PPY), polycarbazole, polyindole, polyazepine, poly(thiophene)s (PT), poly(3,4-ethylenedioxythiophene) (PEDOT), poly(p-phenylene sulfide) (PPS), polyaniline (PANI), or any combination thereof. In some embodiments, the substrate is a copper foil, aluminum foil, nickel, a freestanding carbon sheet, graphite, graphene, carbon nanotubes, or any combination thereof. In some embodiments, the mixture comprises a w/w concentration of the MCMB of about 85% to about 99%. In some embodiments, the mixture comprises a w/w concentration of the carbon black of about 2% to about 8%. In some embodiments, the mixture comprises a w/w concentration of the CMC of about 0.1% to about 0.8%. In some embodiments, the mixture comprises a w/w concentration of the hydrophilic binder of about 1% to about 10%. In some embodiments, at least a portion of the forming of the mixture is performed under a pressure below atmospheric pressure. In some embodiments, the mixture has a viscosity of about 1,000 mPa*s to about 2,000 mPa*s when it is coated onto the substrate.

Another aspect provided herein is a method of forming a lithium cobalt oxide electrode. In some embodiments, the method comprises forming a mixture of lithium cobalt oxide (LCO), carbon black, a reduced graphene oxide dispersion, a hydrophilic binder, and a solvent, and coating the mixture onto a substrate.

In some embodiments, the hydrophilic binder comprises styrene butadiene rubber (SBR), polyvinylidene fluoride (PVDF), sodium alginate, polytetrafluoroethylene (PTFE), sodium carboxymethyl chitosan (CCTS), polyacrylic acid (PAA), polystyrene sulfonate (PSS), polyvinyl alcohol (PVA), poly(fluorene), polyphenylene, polypyrene, polyazulene, polynaphthalene, poly(acetylene), poly(p-phenylene vinylene), poly(pyrrole) (PPY), polycarbazole, polyindole, polyazepine, poly(thiophene)s (PT), poly(3,4-ethylenedioxythiophene) (PEDOT), poly(p-phenylene sulfide) (PPS), polyaniline (PANI), or any combination thereof. In some embodiments, the solvent comprises N-Methyl-2-pyrrolidone (NMP), water, dimethyl sulfoxide (DMSO), or any combination thereof. In some embodiments, at least a portion of the lithium cobalt oxide is in the form of a powder. In some embodiments, the substrate is a copper foil, aluminum foil, nickel, a freestanding carbon sheet, graphite, graphene, carbon nanotubes, or any combination thereof. In some embodiments, the mixture comprises a w/w concentration of the LCO of about 85% to about 99%. In some embodiments, the mixture comprises a w/w concentration of the carbon black of about 0.5% to about 4%. In some embodiments, the mixture comprises a w/w concentration of the reduced graphene oxide dispersion of about 0.05% to about 1%. In some embodiments, the mixture comprises a w/w concentration of the hydrophilic binder of about 1% to about 10%. In some embodiments, at least a portion of the forming of the mixture is performed under a pressure below atmospheric pressure. In some embodiments, the mixture has a viscosity of about 1,000 mPa*s to about 2,000 mPa*s when it is coated onto the substrate.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
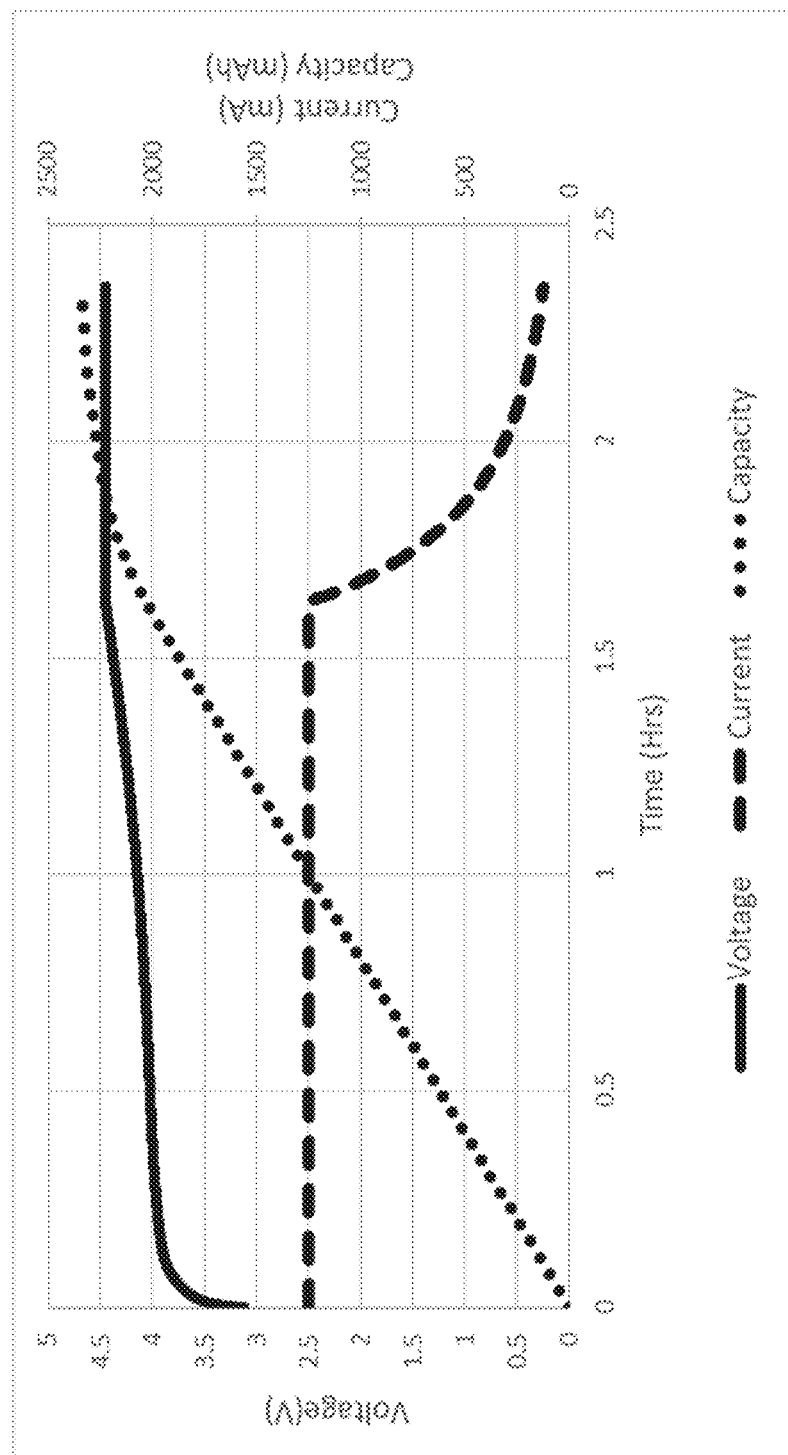
FIG. 1 shows a voltage-current-capacity graph for an exemplary LCO energy storage device, per an embodiment herein.

Provided herein are energy storage devices high energy and power densities, cycle life, and safety. In some embodiments, the energy storage device comprise a non-flammable electrolyte that eliminate and/or reduce fire hazards for improved battery safety, with improved electrode compatibility with electrode materials.

Energy Storage Devices

In one aspect, disclosed herein is a lithium ion energy storage device comprising: a cathode; an anode; and a fire resistant electrolyte. In some embodiments, the lithium ion energy storage device is configured as an electric vehicle battery. In some embodiments, the lithium ion energy storage device has high thermal stability. In some embodiments, an electric vehicle battery comprises a plurality of energy storage devices connected in series and/or in parallel. In some embodiments, an energy storage device comprises a battery pack having a plurality of cells connected in series and/or in parallel. In some embodiments, the battery pack comprises at least 5, 10, 20, 30, 40, 50, 100, or 200 cells connected in series and/or in parallel.

In some embodiments, the energy storage device comprises an electrode comprising mesocarbon microbeads (MCMB). In some embodiments, the energy storage device implements nickel manganese cobalt (NMC) lithium ion battery chemistry. In some embodiments, the energy storage device comprises a lithium cobalt oxide electrode. In some embodiments, the electrodes of the energy storage devices herein comprise graphene. Graphene is a single layer of carbon that is formed from graphite and exhibits high strength and flexibility, enabling it to withstand volume changes during charge and discharge, and thus reducing the risk of internal short circuits. Further, graphene's ability to store charge on its large surface area enables its high capacity and conductivity. The high conductivity of graphene provides a low internal resistance, which prevents overheating during charging and/or discharging, eliminating thermal runaway.

Electrolytes provides a medium for the movement of ions between the anode and cathode of an energy storage device. In some embodiments, the electrolyte comprises a salt (e.g. a lithium salt), solvent, and one or more cycling stability additives. The salts, solvents, and additives herein form an electrolyte that functions at high temperatures without igniting, with stable energy performance. The affordability of the electrolyte components and the efficient methods for forming such electrolytes herein provide a solution to improving the safety of energy storage devices in commercial electronics. In some embodiments, the electrolyte comprises g-butyrolactone (gbl) that provides the safety while maintaining the life span and performance of the energy storage device.

In some embodiments, the lithium ion energy storage device is configured to pass a nail penetration test simulating an internal short circuit. When a currently available energy storage device short circuits, due to overcharging or penetration, the energy stored therein is suddenly released initiating an unstoppable chain reaction (e.g. thermal runaway), wherein temperatures within such devices increases rapidly (e.g. hundreds of degrees per millisecond), causing ignition. By contrast, if the energy storage devices described herein is shorted, due to overcharging or penetration, the thermal stability of the electrolytes provided herein prevent ignition. Further, the energy storage devices described herein are capable of operating over wide temperature ranges and for use in all-weather conditions.

Electrolytes

In some embodiments, the fire resistant electrolyte comprises lactone. In some embodiments, the lactone is an organic solvent with a high flash point and high boiling. By contrast, many electrolytes exhibit a low flash point, and are thus highly flammable at low temperatures. In some embodiments, the lactone is an organic solvent that forms a stable solid electrolyte interphase (SEI) layer to reduces capacitive changes during repeated cycling to increase stability.

the lactone is butyrolactone, valerolactone, a carboxylic ester, or any combination thereof. In some embodiments, the butyrolactone is gamma-butyrolactone. In some embodiments, the butyrolactone is gamma-butyrolactone, α-methyl-γ-butyrolactone, α-bromo-γ-butyrolactone, delta-valerolactone, or any combination thereof. In some embodiments, the valerolactone is gamma-valerolactone. Gamma-butyrolactone is an organic solvent with a low flashpoint that forms a stable SEI, enabling its use in lithium ion batteries. Further, the unique properties of Gamma-butyrolactone form stable SEI on both the cathode and anode, even in the presence of additives.

In some embodiments, the fire-resistant electrolyte further comprises a lithium salt. In some embodiments, the lithium salt comprises lithium bis(oxalato)borate (LiBOB), lithium tetrafluoroborate (LiBF$_4$), 1,3-Dioxol-2-one (VC) or 4-Vinyl-1,3-dioxolan-2-one (VEC), or 1,1,2,2-Tetrafluoroethyl-2,2,3,3-tetrafluoropropyl ether (FEP), LiPF$_6$, LiFDOB, LiClO$_4$, LiTf, LiTFSi, LiAsF$_6$, ethylene carbonate (EC), diethyl carbonate (DEC), dimethyl carbonate (DMC) and ethyl methyl carbonate (EMC), or any combination thereof. In some embodiments, the fire-resistant electrolyte further comprises a SEI stabilizer additive. In some embodiments, the SEI stabilizer additive comprises vinylene carbonate, vinylethylene carbonate, ethylene carbonate, phenylethylene carbonate, propylene carbonate, propanesultone, propenesultone, TMSPi, TMSB, or any combination thereof. In some embodiments, the fire-resistant electrolyte further comprises a fluorinated liquid solvent. In some embodiments, the fluorinated liquid solvent comprises PVF (polyvinylfluoride), PVDF (polyvinylidene fluoride), PTFE (polytetrafluoroethylene), PCTFE (polychlorotrifluoroethylene), PFA, MFA (perfluoroalkoxy polymer), FEP (fluorinated ethylene-propylene), ETFE (polyethylenetetrafluoroethylene), ECTFE (polyethylenechlorotrifluoroethylene), FFPM/FFKM (Perfluorinated Elastomer [Perfluoroelastomer]), FPM/FKM (Fluorocarbon [Chlorotrifluoroethylenevinylidene fluoride]), FEPM (Fluoroelastomer [Tetrafluoroethylene-Propylene]), PFPE (Perfluoropolyether), PFSA (Perfluorosulfonic acid), Perfluoropolyoxetane, or any combination thereof.

In some embodiments, a w/w percentage of the gamma-butyrolactone in the fire-resistant electrolyte is about 30% to about 90%. In some embodiments, a w/w percentage of the gamma-butyrolactone in the fire-resistant electrolyte is about 30% to about 35%, about 30% to about 40%, about 30% to about 45%, about 30% to about 50%, about 30% to about 55%, about 30% to about 60%, about 30% to about 65%, about 30% to about 70%, about 30% to about 75%, about 30% to about 80%, about 30% to about 90%, about 35% to about 40%, about 35% to about 45%, about 35% to about 50%, about 35% to about 55%, about 35% to about 60%, about 35% to about 65%, about 35% to about 70%, about 35% to about 75%, about 35% to about 80%, about 35% to about 90%, about 40% to about 45%, about 40% to about 50%, about 40% to about 55%, about 40% to about 60%, about 40% to about 65%, about 40% to about 70%, about 40% to about 75%, about 40% to about 80%, about 40% to about 90%, about 45% to about 50%, about 45% to about 55%, about 45% to about 60%, about 45% to about 65%, about 45% to about 70%, about 45% to about 75%, about 45% to about 80%, about 45% to about 90%, about 50% to about 55%, about 50% to about 60%, about 50% to about 65%, about 50% to about 70%, about 50% to about 75%, about 50% to about 80%, about 50% to about 90%, about 55% to about 60%, about 55% to about 65%, about 55% to about 70%, about 55% to about 75%, about 55% to about 80%, about 55% to about 90%, about 60% to about 65%, about 60% to about 70%, about 60% to about 75%, about 60% to about 80%, about 60% to about 90%, about 65% to about 70%, about 65% to about 75%, about 65% to about 80%, about 65% to about 90%, about 70% to about 75%, about 70% to about 80%, about 70% to about 90%, about 75% to about 80%, about 75% to about 90%, or about 80% to about 90%, including increments therein. In some embodiments, a w/w percentage of the gamma-butyrolactone in the fire-resistant electrolyte is about 30%, about 35%, about 40%, about 45%, about 50%, about 55%, about 60%, about 65%, about 70%, about 75%, about 80%, or about 90%. In some embodiments, a w/w percentage of the gamma-butyrolactone in the fire-resistant electrolyte is at least about 30%, about 35%, about 4000, about 45%, about 50%, about 55%, about 60%, about 65%, about 70%, about 75%, or about 80%. In some embodiments, a w/w percentage of the gamma-butyrolactone in the fire-resistant electrolyte is at most about 35%, about 40%, about 45%, about 50%, about 55%, about 60%, about 65%, about 70%, about 75%, about 80%, or about 90%.

In some embodiments, a w/w percentage of the 1,1,2,2-Tetrafluoroethyl-2,2,3,3-tetrafluoropropyl ether (FEP) in the fire-resistant electrolyte is about 5% to about 50%. In some embodiments, a w/w percentage of the 1,1,2,2-Tetrafluoroethyl-2,2,3,3-tetrafluoropropyl ether (FEP) in the fire-resistant electrolyte is about 5% to about 10%, about 5% to about 15%, about 5% to about 20%, about 5% to about 25%, about 5% to about 30%, about 5% to about 35%, about 5% to about 40%, about 5% to about 45%, about 5% to about 50%, about 10% to about 15%, about 10% to about 20%, about 10% to about 25%, about 10% to about 30%, about 10% to about 35%, about 10% to about 40%, about 10% to about 45%, about 10% to about 50%, about 15% to about 20%, about 15% to about 25%, about 15% to about 30%, about 15% to about 35%, about 15% to about 40%, about 15% to about 45%, about 15% to about 50%, about 20% to about 25%, about 20% to about 30%, about 20% to about 35%, about 20% to about 40%, about 20% to about 45%, about 20% to about 50%, about 25% to about 30%, about 25% to about 35%, about 25% to about 40%, about 25% to about 45%, about 25% to about 50%, about 30% to about 35%, about 30% to about 40%, about 30% to about 45%, about 30% to about 50%, about 35% to about 40%, about 35% to about 45%, about 35% to about 50%, about 40% to about 45%, about 40% to about 50%, or about 45% to about 50%, including increments therein. In some embodiments, a w/w percentage of the 1,1,2,2-Tetrafluoroethyl-2,2,3,3-tetrafluoropropyl ether (FEP) in the fire-resistant electrolyte is about 5%, about 10%, about 15%, about 20%, about 25%, about 30%, about 35%, about 40%, about 45%, or about 50%. In some embodiments, a w/w percentage of the 1,1,2,2-Tetrafluoroethyl-2,2,3,3-tetrafluoropropyl ether (FEP) in the fire-resistant electrolyte is at least about 5%, about 10%, about 15%, about 20%, about 25%, about 30%, about 35%, about 40%, or about 45%. In some embodiments, a w/w percentage of the 1,1,2,2-Tetrafluoroethyl-2,2,3,3-tetrafluoropropyl ether (FEP) in the fire-resistant electrolyte is at most about 10%, about 15%, about 20%, about 25%, about 30%, about 35%, about 40%, about 45%, or about 50%.

In some embodiments, a w/w percentage of the lithium tetrafluoroborate (LiBF4) in the fire-resistant electrolyte is about 1% to about 20%. In some embodiments, a w/w percentage of the lithium tetrafluoroborate (LiBF4) in the fire-resistant electrolyte is about 1% to about 2%, about 1% to about 3%, about 1% to about 4%, about 1% to about 5%, about 1% to about 6%, about 1% to about 8%, about 1% to about 10%, about 1% to about 12%, about 1% to about 14%, about 1% to about 16%, about 1% to about 20%, about 2% to about 3%, about 2% to about 4%, about 2% to about 5%, about 2% to about 6%, about 2% to about 8%, about 2% to about 10%, about 2% to about 12%, about 2% to about 14%, about 2% to about 16%, about 2% to about 20%, about 3% to about 4%, about 3% to about 5%, about 3% to about 6%, about 3% to about 8%, about 3% to about 10%, about 3% to about 12%, about 3% to about 14%, about 3% to about 16%, about 3% to about 20%, about 4% to about 5%, about 4% to about 6%, about 4% to about 8%, about 4% to about 10%, about 4% to about 12%, about 4% to about 14%, about 4% to about 16%, about 4% to about 20%, about 5% to about 6%, about 5% to about 8%, about 5% to about 10%, about 5% to about 12%, about 5% to about 14%, about 5% to about 16%, about 5% to about 20%, about 6% to about 8%, about 6% to about 10%, about 6% to about 12%, about 6% to about 14%, about 6% to about 16%, about 6% to about 20%, about 8% to about 10%, about 8% to about 12%, about 8% to about 14%, about 8% to about 16%, about 8% to about 20%, about 10% to about 12%, about 10% to about 14%, about 10% to about 16%, about 10% to about 20%, about 12% to about 14%, about 12% to about 16%, about 12% to about 20%, about 14% to about 16%, about 14% to about 20%, or about 16% to about 20%, including increments therein. In some embodiments, a w/w percentage of the lithium tetrafluoroborate (LiBF4) in the fire-resistant electrolyte is about 1%, about 2%, about 3%, about 4%, about 5%, about 6%, about 8%, about 10%, about 12%, about 14%, about 16%, or about 20%. In some embodiments, a w/w percentage of the lithium tetrafluoroborate (LiBF4) in the fire-resistant electrolyte is at least about 1%, about 2%, about 3%, about 4%, about 5%, about 6%, about 8%, about 10%, about 12%, about 14%, or about 16%. In some embodiments, a w/w percentage of the lithium tetrafluoroborate (LiBF4) in the fire-resistant electrolyte is at most about 2%, about 3%, about 4%, about 5%, about 6%, about 8%, about 10%, about 12%, about 14%, about 16%, or about 20%.

In some embodiments, a w/w percentage of the 1,3-Dioxol-2-one (VC) or 4-Vinyl-1,3-dioxolan-2-one (VEC) in the fire-resistant electrolyte is about 0.1% to about 10%. In some embodiments, a w/w percentage of the 1,3-Dioxol-2-one (VC) or 4-Vinyl-1,3-dioxolan-2-one (VEC) in the fire-resistant electrolyte is about 0.1% to about 0.2%, about 0.1% to about 0.5%, about 0.1% to about 1%, about 0.1% to about 2%, about 0.1% to about 3%, about 0.1% to about 4%, about 0.1% to about 5%, about 0.1% to about 6%, about 0.1% to about 7%, about 0.1% to about 8%, about 0.1% to about 10%, about 0.2% to about 0.5%, about 0.2% to about 1%, about 0.2% to about 2%, about 0.2% to about 3%, about 0.2% to about 4%, about 0.2% to about 5%, about 0.2% to about 6%, about 0.2% to about 7%, about 0.2% to about 8%, about 0.2% to about 10%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 10%, about 1% to about 2%, about 1% to about 3%, about 1% to about 4%, about 1% to about 5%, about 1% to about 6%, about 1% to about 7%, about 1% to about 8%, about 1% to about 10%, about 2% to about 3%, about 2% to about 4%, about 2% to about 5%, about 2% to about 6%, about 2% to about 7%, about 2% to about 8%, about 2% to about 10%, about 3% to about 4%, about 3% to about 5%, about 3% to about 6%, about 3% to about 7% about 3% to about 8%, about 3% to about 10%, about 4% to about 5%, about 4% to about 6%, about 4% to about 7%, about 4% to about 8%, about 4% to about 10%, about 5% to about 6%, about 5% to about 7% about 5% to about 8%, about 5% to about 10%, about 6% to about 7% about 6% to about 8%, about 6% to about 10%, about 7% to about 8%, about 7% to about 10%, or about 8% to about 10%, including increments therein. In some embodiments, a w/w percentage of the 1,3-Dioxol-2-one (VC) or 4-Vinyl-1,3-dioxolan-2-one (VEC) in the fire-resistant electrolyte is about 0.1%, about 0.2%, about 0.5%, about 1%, about 2%, about 3%, about 4%, about 5%, about 6%, about 7%, about 8%, or about 10%. In some embodiments, a w/w percentage of the 1,3-Dioxol-2-one (VC) or 4-Vinyl-1,3-dioxolan-2-one (VEC) in the fire-resistant electrolyte is at least about 0.1%, about 0.2%, about 0.5%, about 1%, about 2%, about 3%, about 4%, about 5%, about 6%, about 7%, or about 8%. In some embodiments, a w/w percentage of the 1,3-Dioxol-2-one (VC) or 4-Vinyl-1,3-dioxolan-2-one (VEC) in the fire-resistant electrolyte is at most about 0.2%, about 0.5%, about 1%, about 2%, about 3%, about 4%, about 5%, about 6%, about 7%, about 8%, or about 10%.

In some embodiments, a w/w percentage of the lithium bis(oxalato)borate (LiBOB) in the fire-resistant electrolyte is about 0.1% to about 10%. In some embodiments, a w/w percentage of the lithium bis(oxalato)borate (LiBOB) in the fire-resistant electrolyte is about 0.1% to about 0.2%, about 0.1% to about 0.5%, about 0.1% to about 1%, about 0.1% to about 2%, about 0.1% to about 3%, about 0.1% to about 4%, about 0.1% to about 5%, about 0.1% to about 6%, about 0.1% to about 7%, about 0.1% to about 8%, about 0.1% to about 10%, about 0.2% to about 0.5%, about 0.2% to about 1%, about 0.2% to about 2%, about 0.2% to about 3%, about 0.2% to about 4%, about 0.2% to about 5%, about 0.2% to about 6%, about 0.2% to about 7%, about 0.2% to about 8%, about 0.2% to about 10%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 10%, about 1% to about 2%, about 1% to about 3%, about 1% to about 4%, about 1% to about 5%, about 1% to about 6%, about 1% to about 7% about 1% to about 8%, about 1% to about 10%, about 2% to about 3%, about 2% to about 4%, about 2% to about 5%, about 2% to about 6%, about 2% to about 7%, about 2% to about 8%, about 2% to about 10%, about 3% to about 4%, about 3% to about 5%, about 3% to about 6%, about 3% to about 7% about 3% to about 8%, about 3% to about 10%, about 4% to about 5%, about 4% to about 6%, about 4% to about 7%, about 4% to about 8%, about 4% to about 10%, about 5% to about 6%, about 5% to about 7% about 5% to about 8%, about 5% to about 10%, about 6% to about 7% about 6% to about 8%, about 6% to about 10%, about 7% to about 8%, about 7% to about 10%, or about 8% to about 10%, including increments therein. In some embodiments, a w/w percentage of the lithium bis(oxalato)borate (LiBOB) in the fire-resistant electrolyte is about 0.1%, about 0.2%, about 0.5%, about 1%, about 2%, about 3%, about 4%, about 5%, about 6%, about 7%, about 8%, or about 10%. In some embodiments, a w/w percentage of the lithium bis(oxalato)borate (LiBOB) in the fire-resistant electrolyte is at least about 0.1%, about 0.2%, about 0.5%, about 1%, about 2%, about 3%, about 4%, about 5%, about 6%, about 7%, or about 8%. In some embodiments, a w/w percentage of the lithium bis(oxalato)borate (LiBOB) in the fire-resistant electrolyte is at most about 0.2%, about 0.5%, about 1%, about 2%, about 3%, about 4%, about 5%, about 6%, about 7%, about 8%, or about 10%.

Anodes

In some embodiments, the anode comprises a graphite material prepared from a graphite powder. In some embodiments, the graphite powder comprises mesocarbon microbeads, natural graphene, synthetic graphene, or any combination thereof.

In some embodiments, the mesocarbon microbeads, natural graphene, synthetic graphene, or any combination thereof, have a diameter of about 5 microns to about 50 microns. In some embodiments, the mesocarbon microbeads, natural graphene, synthetic graphene, or any combination thereof, have a diameter of about 5 microns to about 10 microns, about 5 microns to about 15 microns, about 5 microns to about 20 microns, about 5 microns to about 25 microns, about 5 microns to about 30 microns, about 5 microns to about 35 microns, about 5 microns to about 40 microns, about 5 microns to about 45 microns, about 5 microns to about 50 microns, about 10 microns to about 15 microns, about 10 microns to about 20 microns, about 10 microns to about 25 microns, about 10 microns to about 30 microns, about 10 microns to about 35 microns, about 10 microns to about 40 microns, about 10 microns to about 45 microns, about 10 microns to about 50 microns, about 15 microns to about 20 microns, about 15 microns to about 25 microns, about 15 microns to about 30 microns, about 15 microns to about 35 microns, about 15 microns to about 40 microns, about 15 microns to about 45 microns, about 15 microns to about 50 microns, about 20 microns to about 25 microns, about 20 microns to about 30 microns, about 20 microns to about 35 microns, about 20 microns to about 40 microns, about 20 microns to about 45 microns, about 20 microns to about 50 microns, about 25 microns to about 30 microns, about 25 microns to about 35 microns, about 25 microns to about 40 microns, about 25 microns to about 45 microns, about 25 microns to about 50 microns, about 30 microns to about 35 microns, about 30 microns to about 40 microns, about 30 microns to about 45 microns, about 30 microns to about 50 microns, about 35 microns to about 40 microns, about 35 microns to about 45 microns, about 35 microns to about 50 microns, about 40 microns to about 45 microns, about 40 microns to about 50 microns, or about 45 microns to about 50 microns, including increments therein. In some embodiments, the mesocarbon microbeads, natural graphene, synthetic graphene, or any combination thereof, have a diameter of about 5 microns, about 10 microns, about 15 microns, about 20 microns, about 25 microns, about 30 microns, about 35 microns, about 40 microns, about 45 microns, or about 50 microns. In some embodiments, the mesocarbon microbeads, natural graphene, synthetic graphene, or any combination thereof, have a diameter of at least about 5 microns, about 10 microns, about 15 microns, about 20 microns, about 25 microns, about 30 microns, about 35 microns, about 40 microns, or about 45 microns. In some embodiments, the mesocarbon microbeads, natural graphene, synthetic graphene, or any combination thereof, have a diameter of at most about 10 microns, about 15 microns, about 20 microns, about 25 microns, about 30 microns, about 35 microns, about 40 microns, about 45 microns, or about 50 microns.

In some embodiments, MCBM's low surface area minimizes the side reactions with the electrolyte, to stabilize the lithium ion battery. In some embodiments, MCMB's spherical structure and high electronic conductivity provide a low internal resistance and high power capability.

In some embodiments, the anode comprises graphite, carbon black, a hydrophilic binder, carboxymethyl cellulose, or any combination thereof. In some embodiments, the hydrophilic binder comprises styrene butadiene (SBR), polyvinylidene fluoride (PVDF), sodium alginate, polytetrafluoroethylene (PTFE), sodium carboxymethyl chitosan (CCTS), polyacrylic acid (PAA), polystyrene sulfonate (PSS), polyvinyl alcohol (PVA), poly(fluorene), polyphenylene, polypyrene, polyazulene, polynaphthalene, poly(acetylene), poly(p-phenylene vinylene), poly(pyrrole) (PPY), polycarbazole, polyindole, polyazepine, poly(thiophene)s (PT), poly(3,4-ethylenedioxythiophene) (PEDOT), poly(p-phenylene sulfide) (PPS), polyaniline (PANI), or any combination thereof.

In some embodiments, the anode comprises a w/w concentration of graphite of about 70% to about 95%. In some embodiments, the anode comprises a w/w concentration of graphite of about 70% to about 75%, about 70% to about 80%, about 70% to about 85%, about 70% to about 90%, about 70% to about 95%, about 75% to about 80%, about 75% to about 85%, about 75% to about 90%, about 75% to about 95%, about 80% to about 85%, about 80% to about 90%, about 80% to about 95%, about 85% to about 90%, about 85% to about 95%, or about 90% to about 95%, including increments therein. In some embodiments, the anode comprises a w/w concentration of graphite of about 70%, about 75%, about 80%, about 85%, about 90%, or about 95%. In some embodiments, the anode comprises a w/w concentration of graphite of at least about 70%, about 75%, about 80%, about 85%, or about 90%. In some embodiments, the anode comprises a w/w concentration of graphite of at most about 75%, about 80%, about 85%, about 90%, or about 95%.

In some embodiments, the anode comprises a w/w concentration of carbon black of about 1% to about 5%. In some embodiments, the anode comprises a w/w concentration of carbon black of about 1% to about 1.5%, about 1% to about 2%, about 1% to about 2.5%, about 1% to about 3%, about 1% to about 3.5%, about 1% to about 4%, about 1% to about 4.5%, about 1% to about 5%, about 1.5% to about 2%, about 1.5% to about 2.5%, about 1.5% to about 3%, about 1.5% to about 3.5%, about 1.5% to about 4%, about 1.5% to about 4.5%, about 1.5% to about 5%, about 2% to about 2.5%, about 2% to about 3%, about 2% to about 3.5%, about 2% to about 4%, about 2% to about 4.5%, about 2% to about 5%, about 2.5% to about 3%, about 2.5% to about 3.5%, about 2.5% to about 4%, about 2.5% to about 4.5%, about 2.5% to about 5%, about 3% to about 3.5%, about 3% to about 4%, about 3% to about 4.5%, about 3% to about 5%, about 3.5% to about 4%, about 3.5% to about 4.5%, about 3.5% to about 5%, about 4% to about 4.5%, about 4% to about 5%, or about 4.5% to about 5%, including increments therein. In some embodiments, the anode comprises a w/w concentration of carbon black of about 1%, about 1.5%, about 2%, about 2.5%, about 3%, about 3.5%, about 4%, about 4.5%, or about 5%. In some embodiments, the anode comprises a w/w concentration of carbon black of at least about 1%, about 1.5%, about 2%, about 2.5%, about 3%, about 3.5%, about 4%, or about 4.5%. In some embodiments, the anode comprises a w/w concentration of carbon black of at most about 1.5%, about 2%, about 2.5%, about 3%, about 3.5%, about 4%, about 4.5%, or about 5%.

In some embodiments, the anode comprises a w/w concentration of the hydrophilic binder of about 1% to about 10%. In some embodiments, the anode comprises a w/w concentration of the hydrophilic binder of about 1% to about 2%, about 1% to about 3%, about 1% to about 4%, about 1% to about 5% about 1% to about 6%, about 1% to about 7%, about 1% to about 8%, about 1% to about 9% about 1% to about 10%, about 2% to about 3%, about 2% to about 4%, about 2% to about 5% about 2% to about 6%, about 2% to about 7%, about 2% to about 8%, about 2% to about 9% about 2% to about 10%, about 3% to about 4%, about 3% to about 5%, about 3% to about 6%, about 3% to about 7%, about 3% to about 8%, about 3% to about 9%, about 3% to about 10%, about 4% to about 5%, about 4% to about 6%, about 4% to about 7%, about 4% to about 8%, about 4% to about 9% about 4% to about 10%, about 5% to about 6%, about 5% to about 7% about 5% to about 8%, about 5% to about 9%, about 5% to about 10%, about 6% to about 7%, about 6% to about 8%, about 6% to about 9%, about 6% to about 10%, about 7% to about 8%, about 7% to about 9% about 7% to about 10%, about 8% to about 9%, about 8% to about 10%, or about 9% to about 10%, including increments therein. In some embodiments, the anode comprises a w/w concentration of the hydrophilic binder of about 1%, about 2%, about 3%, about 4%, about 5%, about 6%, about 7%, about 8%, about 9%, or about 10%. In some embodiments, the anode comprises a w/w concentration of the hydrophilic binder of at least about 1%, about 2%, about 3%, about 4%, about 5%, about 6%, about 7%, about 8%, or about 9%. In some embodiments, the anode comprises a w/w concentration of the hydrophilic binder of at most about 2%, about 3%, about 4%, about 5%, about 6%, about 7%, about 8%, about 9%, or about 10%.

In some embodiments, the anode comprises a w/w concentration of carboxymethyl cellulose of about 0.1% to about 5%. In some embodiments, the anode comprises a w/w concentration of carboxymethyl cellulose of about 0.1% to about 0.2%, about 0.1% to about 0.5%, about 0.1% to about 1%, about 0.1% to about 1.5%, about 0.1% to about 2%, about 0.1% to about 2.5%, about 0.1% to about 3%, about 0.1% to about 3.5%, about 0.1% to about 4%, about 0.1% to about 4.5%, about 0.1% to about 5%, about 0.2% to about 0.5%, about 0.2% to about 1%, about 0.2% to about 1.5%, about 0.2% to about 2%, about 0.2% to about 2.5%, about 0.2% to about 3%, about 0.2% to about 3.5%, about 0.2% to about 4%, about 0.2% to about 4.5%, about 0.2% to about 5%, about 0.5% to about 1%, about 0.5% to about 1.5%, about 0.5% to about 2%, about 0.5% to about 2.5%, about 0.5% to about 3%, about 0.5% to about 3.5%, about 0.5% to about 4%, about 0.5% to about 4.5%, about 0.5% to about 5%, about 1% to about 1.5%, about 1% to about 2%, about 1% to about 2.5%, about 1% to about 3%, about 1% to about 3.5%, about 1% to about 4%, about 1% to about 4.5%, about 1% to about 5%, about 1.5% to about 2%, about 1.5% to about 2.5%, about 1.5% to about 3%, about 1.5% to about 3.5%, about 1.5% to about 4%, about 1.5% to about 4.5%, about 1.5% to about 5%, about 2% to about 2.5%, about 2% to about 3%, about 2% to about 3.5%, about 2% to about 4%, about 2% to about 4.5%, about 2% to about 5%, about 2.5% to about 3%, about 2.5% to about 3.5%, about 2.5% to about 4%, about 2.5% to about 4.5%, about 2.5% to about 5%, about 3% to about 3.5%, about 3% to about 4%, about 3% to about 4.5%, about 3% to about 5%, about 3.5% to about 4%, about 3.5% to about 4.5%, about 3.5% to about 5%, about 4% to about 4.5%, about 4% to about 5%, or about 4.5% to about 5%, including increments therein. In some embodiments, the anode comprises a w/w concentration of carboxymethyl cellulose of about 0.1%, about 0.2%, about 0.5%, about 1%, about 1.5%, about 2%, about 2.5%, about 3%, about 3.5%, about 4%, about 4.5%, or about 5%. In some embodiments, the anode comprises a w/w concentration of carboxymethyl cellulose of at least about 0.1%, about 0.2%, about 0.5%, about 1%, about 1.5%, about 2%, about 2.5%, about 3%, about 3.5%, about 4%, or about 4.5%. In some embodiments, the anode comprises a w/w concentration of carboxymethyl cellulose of at most about 0.2%, about 0.5%, about 1%, about 1.5%, about 2%, about 2.5%, about 3%, about 3.5%, about 4%, about 4.5%, or about 5%.

In some embodiments, the anode has a specific capacity of at least about 100, 150, 200, 250, 300, or 340 mAh/g. In some embodiments, the anode has an areal capacity of at least about 1, 2, 3, 4, 5, 6, or 7 mAh/cm$^2$. In some embodiments, the anode has a loading mass of at least about 5, 10, 15, or 20 mg/cm$^2$. In some embodiments, the anode has a packing density from about 0.5 to about 3 g/cm$^3$, from about 1 to about 3 g/cm$^3$, from about 1 to about 2 g/cm$^3$, or from about 1.5 to about 1.7 g/cm$^3$.

Cathodes

In some embodiments, the energy storage devices disclosed herein comprise a cathode. In some embodiments, the cathode is a lithium nickel cobalt aluminum oxide (NCA) cathode. In some embodiments, the cathode is a nickel:cobalt:manganese (NMC) cathode. In some embodiments, the cathode comprises lithium cobalt oxide. In some embodiments, the cathode comprises polyvinylidine fluoride (PVDF), carbon black, graphene, or any combination thereof. In some embodiments, the polyvinylidine fluoride (PVDF) is in an N-methyl-2-pyrrolidone solvent. In some embodiments, the graphene comprises a reduced graphene oxide dispersion.

In some embodiments, rGO increases an electrode's conductivity and mechanical strength during charge and discharge. In some embodiments, rGO retains the structural integrity of the electrode, by preventing cracking during operational volume changes. In some embodiments, the rGO is produced in the powder form and then is processed in solution to produce a three-dimensional network. In some embodiments, the rGO powder is produced by thermal reduction, microwave, reduction, or both.

In some embodiments, the cathode comprises a w/w concentration of lithium cobalt oxide of about 70% to about 99%. In some embodiments, the cathode comprises a w/w concentration of lithium cobalt oxide of about 70% to about 75%, about 70% to about 80%, about 70% to about 85%, about 70% to about 90%, about 70% to about 95%, about 70% to about 99%, about 75% to about 80%, about 75% to about 85%, about 75% to about 90%, about 75% to about 95%, about 75% to about 99%, about 80% to about 85%, about 80% to about 90%, about 80% to about 95%, about 80% to about 99%, about 85% to about 90%, about 85% to about 95%, about 85% to about 99%, about 90% to about 95%, about 90% to about 99%, or about 95% to about 99%, including increments therein. In some embodiments, the cathode comprises a w/w concentration of lithium cobalt oxide of about 70%, about 75%, about 80%, about 85%, about 90%, about 95%, or about 99%. In some embodiments, the cathode comprises a w/w concentration of lithium cobalt oxide of at least about 70%, about 75%, about 80%, about 85%, about 90%, or about 95%. In some embodiments, the cathode comprises a w/w concentration of lithium cobalt oxide of at most about 75%, about 80%, about 85%, about 90%, about 95%, or about 99%.

In some embodiments, the cathode comprises a w/w concentration of polyvinylidine fluoride (PVDF) of about 0.5% to about 5%. In some embodiments, the cathode comprises a w/w concentration of polyvinylidine fluoride (PVDF) of about 0.5% to about 1%, about 0.5% to about 1.5%, about 0.5% to about 2%, about 0.5% to about 2.5%, about 0.5% to about 3%, about 0.5% to about 3.5%, about 0.5% to about 4%, about 0.5% to about 4.5%, about 0.5% to about 5%, about 1% to about 1.5%, about 1% to about 2%, about 1% to about 2.5%, about 1% to about 3%, about 1% to about 3.5%, about 1% to about 4%, about 1% to about 4.5%, about 1% to about 5%, about 1.5% to about 2%, about 1.5% to about 2.5%, about 1.5% to about 3%, about 1.5% to about 3.5%, about 1.5% to about 4%, about 1.5% to about 4.5%, about 1.5% to about 5%, about 2% to about 2.5%, about 2% to about 3%, about 2% to about 3.5%, about 2% to about 4%, about 2% to about 4.5%, about 2% to about 5%, about 2.5% to about 3%, about 2.5% to about 3.5%, about 2.5% to about 4%, about 2.5% to about 4.5%, about 2.5% to about 5%, about 3% to about 3.5%, about 3% to about 4%, about 3% to about 4.5%, about 3% to about 5%, about 3.5% to about 4%, about 3.5% to about 4.5%, about 3.5% to about 5%, about 4% to about 4.5%, about 4% to about 5%, or about 4.5% to about 5%, including increments therein. In some embodiments, the cathode comprises a w/w concentration of polyvinylidine fluoride (PVDF) of about 0.5%, about 1%, about 1.5%, about 2%, about 2.5%, about 3%, about 3.5%, about 4%, about 4.5%, or about 5%. In some embodiments, the cathode comprises a w/w concentration of polyvinylidine fluoride (PVDF) of at least about 0.5%, about 1%, about 1.5%, about 2%, about 2.5%, about 3%, about 3.5%, about 4%, or about 4.5%. In some embodiments, the cathode comprises a w/w concentration of polyvinylidine fluoride (PVDF) of at most about 1%, about 1.5%, about 2%, about 2.5%, about 3%, about 3.5%, about 4%, about 4.5%, or about 5%.

In some embodiments, the cathode comprises a w/w concentration of carbon black of about 0.1% to about 5%. In some embodiments, the cathode comprises a w/w concentration of carbon black of about 0.5% to about 1%, about 0.5% to about 1.5%, about 0.5% to about 2%, about 0.5% to about 2.5%, about 0.5% to about 3%, about 0.5% to about 3.5%, about 0.5% to about 4%, about 0.5% to about 4.5%, about 0.5% to about 5%, about 0.5% to about 0.1%, about 1% to about 1.5%, about 1% to about 2%, about 1% to about 2.5%, about 1% to about 3%, about 1% to about 3.5%, about 1% to about 4%, about 1% to about 4.5%, about 1% to about 5%, about 1% to about 0.1%, about 1.5% to about 2%, about 1.5% to about 2.5%, about 1.5% to about 3%, about 1.5% to about 3.5%, about 1.5% to about 4%, about 1.5% to about 4.5%, about 1.5% to about 5%, about 1.5% to about 0.1%, about 2% to about 2.5%, about 2% to about 3%, about 2% to about 3.5%, about 2% to about 4%, about 2% to about 4.5%, about 2% to about 5%, about 2% to about 0.1%, about 2.5% to about 3%, about 2.5% to about 3.5%, about 2.5% to about 4%, about 2.5% to about 4.5%, about 2.5% to about 5%, about 2.5% to about 0.1%, about 3% to about 3.5%, about 3% to about 4%, about 3% to about 4.5%, about 3% to about 5%, about 3% to about 0.1%, about 3.5% to about 4%, about 3.5% to about 4.5%, about 3.5% to about 5%, about 3.5% to about 0.1%, about 4% to about 4.5%, about 4% to about 5%, about 4% to about 0.1%, about 4.5% to about 5%, about 4.5% to about 0.1%, or about 5% to about 0.1%, including increments therein. In some embodiments, the cathode comprises a w/w concentration of carbon black of about 0.5%, about 1%, about 1.5%, about 2%, about 2.5%, about 3%, about 3.5%, about 4%, about 4.5%, about 5%, or about 0.1%. In some embodiments, the cathode comprises a w/w concentration of carbon black of at least about 0.5%, about 1%, about 1.5%, about 2%, about 2.5%, about 3%, about 3.5%, about 4%, about 4.5%, or about 5%. In some embodiments, the cathode comprises a w/w concentration of carbon black of at most about 1%, about 1.5%, about 2%, about 2.5%, about 3%, about 3.5%, about 4%, about 4.5%, about 5%, or about 0.1%.

In some embodiments, the cathode comprises a w/w concentration of graphene of about 0.001% to about 5%. In some embodiments, the cathode comprises a w/w concentration of graphene of about 0.001% to about 0.005%, about 0.001% to about 0.01%, about 0.001% to about 0.05%, about 0.001% to about 0.1%, about 0.001% to about 0.5%, about 0.001% to about 1%, about 0.001% to about 2%, about 0.001% to about 3%, about 0.001% to about 4%, about 0.001% to about 5%, about 0.005% to about 0.01%, about 0.005% to about 0.05%, about 0.005% to about 0.1%, about 0.005% to about 0.5%, about 0.005% to about 1%, about 0.005% to about 2%, about 0.005% to about 3%, about 0.005% to about 4%, about 0.005% to about 5%, about 0.01% to about 0.05%, about 0.01% to about 0.1%, about 0.01% to about 0.5%, about 0.01% to about 1%, about 0.01% to about 2%, about 0.01% to about 3%, about 0.01% to about 4%, about 0.01% to about 5%, about 0.05% to about 0.1%, about 0.05% to about 0.5%, about 0.05% to about 1%, about 0.05% to about 2%, about 0.05% to about 3%, about 0.05% to about 4%, about 0.05% to about 5%, about 0.1% to about 0.5%, about 0.1% to about 1%, about 0.1% to about 2%, about 0.1% to about 3%, about 0.1% to about 4%, about 0.1% to about 5%, about 0.5% to about 1%, about 0.5% to about 2%, about 0.5% to about 3%, about 0.5% to about 4%, about 0.5% to about 5%, about 1% to about 2%, about 1% to about 3%, about 1% to about 4%, about 1% to about 5% about 2% to about 3% about 2% to about 4%, about 2% to about 5%, about 3% to about 4%, about 3% to about 5%, or about 4% to about 5%, including increments therein. In some embodiments, the cathode comprises a w/w concentration of graphene of about 0.001%, about 0.005%, about 0.01%, about 0.05%, about 0.1%, about 0.5%, about 1%, about 2%, about 3%, about 4%, or about 5%. In some embodiments, the cathode comprises a w/w concentration of graphene of at least about 0.001%, about 0.005%, about 0.01%, about 0.05%, about 0.1%, about 0.5%, about 1%, about 2%, about 3%, or about 4%. In some embodiments, the cathode comprises a w/w concentration of graphene of at most about 0.005%, about 0.01%, about 0.05%, about 0.1%, about 0.5%, about 1%, about 2%, about 3%, about 4%, or about 5%.

In some embodiments, the polyvinylidine fluoride (PVDF) is in an N-methyl-2-pyrrolidone solvent. In some embodiments, the graphene comprises a reduced graphene oxide dispersion. In some embodiments, the cathode is a nickel:cobalt:manganese cathode.

In some embodiments, the cathode comprises a Ni:Co:Mn ratio of about 5:2:3. In some embodiments, the cathode comprises a Ni:Co:Mn ratio of about 5:2:3, 5:1:3, 5:3:3, 5:2:4, 5:1:4, 5:3:4, 4:2:3, 4:1:3, 4:3:3, 4:2:4, 4:1:4, 4:3:4, 6:2:3, 6:1:3, 6:3:3, 6:2:4, 6:1:4, or 6:3:4.

In some embodiments, the lithium ion energy storage device is configured as an electric vehicle battery. In some embodiments, the cathode is a lithium nickel cobalt aluminum oxide (NCA) cathode. In some embodiments, the cathode has a w/w concentration of the lithium nickel cobalt aluminum oxide of from 30% to 90% w/w nickel:cobalt:aluminum oxide and from about 1% to about 15% lithium.

In some embodiments, the cathode has a w/w concentration of the lithium nickel cobalt aluminum oxide of about 30% to about 90%. In some embodiments, the cathode has a w/w concentration of the lithium nickel cobalt aluminum oxide of about 30% to about 35%, about 30% to about 40%, about 30% to about 45%, about 30% to about 50%, about 30% to about 55%, about 30% to about 60%, about 30% to about 65%, about 30% to about 70%, about 30% to about 80%, about 30% to about 90%, about 35% to about 40%, about 35% to about 45%, about 35% to about 50%, about 35% to about 55%, about 35% to about 60%, about 35% to about 65%, about 35% to about 70%, about 35% to about 80%, about 35% to about 90%, about 40% to about 45%, about 40% to about 50%, about 40% to about 55%, about 40% to about 60%, about 40% to about 65%, about 40% to about 70%, about 40% to about 80%, about 40% to about 90%, about 45% to about 50%, about 45% to about 55%, about 45% to about 60%, about 45% to about 65%, about 45% to about 70%, about 45% to about 80%, about 45% to about 90%, about 50% to about 55%, about 50% to about 60%, about 50% to about 65%, about 50% to about 70%, about 50% to about 80%, about 50% to about 90%, about 55% to about 60%, about 55% to about 65%, about 55% to about 70%, about 55% to about 80%, about 55% to about 90%, about 60% to about 65%, about 60% to about 70%, about 60% to about 80%, about 60% to about 90%, about 65% to about 70%, about 65% to about 80%, about 65% to about 90%, about 70% to about 80%, about 70% to about 90%, or about 80% to about 90%, including increments therein. In some embodiments, the cathode has a w/w concentration of the lithium nickel cobalt aluminum oxide of about 30%, about 35%, about 40%, about 45%, about 50%, about 55%, about 60%, about 65%, about 70%, about 80%, or about 90%. In some embodiments, the cathode has a w/w concentration of the lithium nickel cobalt aluminum oxide of at least about 30%, about 35%, about 40%, about 45%, about 50%, about 55%, about 60%, about 65%, about 70%, or about 80%. In some embodiments, the cathode has a w/w concentration of the lithium nickel cobalt aluminum oxide of at most about 35%, about 40%, about 45%, about 50%, about 55%, about 60%, about 65%, about 70%, about 80%, or about 90%.

In some embodiments, the cathode has a w/w concentration of lithium of about 1% to about 15%. In some embodiments, the cathode has a w/w concentration of lithium of about 1% to about 2%, about 1% to about 3%, about 1% to about 4%, about 1% to about 5%, about 1% to about 6%, about 1% to about 8%, about 1% to about 10%, about 1% to about 12%, about 1% to about 15%, about 2% to about 3%, about 2% to about 4%, about 2% to about 5%, about 2% to about 6%, about 2% to about 8%, about 2% to about 10%, about 2% to about 12%, about 2% to about 15%, about 3% to about 4%, about 3% to about 5%, about 3% to about 6%, about 3% to about 8%, about 3% to about 10%, about 3% to about 12%, about 3% to about 15%, about 4% to about 5%, about 4% to about 6%, about 4% to about 8%, about 4% to about 10%, about 4% to about 12%, about 4% to about 15%, about 5% to about 6%, about 5% to about 8%, about 5% to about 10%, about 5% to about 12%, about 5% to about 15%, about 6% to about 8%, about 6% to about 10%, about 6% to about 12%, about 6% to about 15%, about 8% to about 10%, about 8% to about 12%, about 8% to about 15%, about 10% to about 12%, about 10% to about 15%, or about 12% to about 15%, including increments therein. In some embodiments, the cathode has a w/w concentration of lithium of about 1%, about 2%, about 3%, about 4%, about 5%, about 6%, about 8%, about 10%, about 12%, or about 15%. In some embodiments, the cathode has a w/w concentration of lithium of at least about 1%, about 2%, about 3%, about 4%, about 5%, about 6%, about 8%, about 10%, or about 12%. In some embodiments, the cathode has a w/w concentration of lithium of at most about 2%, about 3%, about 4%, about 5%, about 6%, about 8%, about 10%, about 12%, or about 15%.

In some embodiments, the lithium ion energy storage device has a rate capacity of at least about 1500, 1600, 1700, 1800, 1900, 2000, 2100, 2200, or 2400 mAh. In some embodiments, the lithium ion energy storage device has a capacity of at least about 2000, 2100, 2200, 2400, 2500, 2600, 2700, or 2800 mAh. In some embodiments, the lithium ion energy storage device has a nominal voltage of at least about 2.5, 2.6, 2.7, 2.8, 2.9, 3.0, 3.1, 3.2, 3.3, 3.4, 3.5, 3.6, 3.7, or 3.8 V. In some embodiments, the lithium ion energy storage device has an internal resistance of at most about 26, 30, 40, 50, 60, 70, 80, 90, or 100 mΩ. In some embodiments, the lithium ion energy storage device retains at least about 60%, 65%, 70%, 75%, 80%, 85%, or 90% capacity after at least about 650, 700, 750, 800, 850, 900, 950, or 1000 cycles. In some embodiments, the lithium ion energy storage device has an energy density of at least about 100, 110, 120, 130, 140, 150, 160, 170, 180, 190, 200, or 210 Wh/kg. In some embodiments, the lithium ion energy storage device has an energy density of at least about 300, 350, 400, 450, 500, or 550 Wh/L.

In some embodiments, a discharge capacity of the lithium ion energy storage device decreases by at most about 30%, 28%, 26%, 24%, 22%, or 20% between operation at a temperature of about 0° C. and about −20° C. In some embodiments, a discharge capacity of the lithium ion energy storage device decreases by at most about 10%, 9%, 8%, 7%, 6%, 5%, 4%, or 3% between operation at a temperature of about 20° C. and about 0° C. In some embodiments, the lithium ion energy storage device is configured to pass a nail penetration test.

In some embodiments, the lithium ion energy storage device is configured for charging at temperatures of about 0° C. to about 45° C. In some embodiments, the lithium ion energy storage device is configured for charging at temperatures of about 0° C. to about 5° C., about 0° C. to about 10° C., about 0° C. to about 15° C., about 0° C. to about 20° C., about 0° C. to about 25° C., about 0° C. to about 30° C., about 0° C. to about 35° C., about 0° C. to about 40° C., about 0° C. to about 45° C., about 5° C. to about 10° C., about 5° C. to about 15° C., about 5° C. to about 20° C., about 5° C. to about 25° C., about 5° C. to about 30° C., about 5° C. to about 35° C., about 5° C. to about 40° C., about 5° C. to about 45° C., about 10° C. to about 15° C., about 10° C. to about 20° C., about 10° C. to about 25° C., about 10° C. to about 30° C., about 10° C. to about 35° C., about 10° C. to about 40° C., about 10° C. to about 45° C., about 15° C. to about 20° C., about 15° C. to about 25° C., about 15° C. to about 30° C., about 15° C. to about 35° C., about 15° C. to about 40° C., about 15° C. to about 45° C., about 20° C. to about 25° C., about 20° C. to about 30° C., about 20° C. to about 35° C., about 20° C. to about 40° C., about 20° C. to about 45° C., about 25° C. to about 30° C., about 25° C. to about 35° C., about 25° C. to about 40° C., about 25° C. to about 45° C., about 30° C. to about 35° C., about 30° C. to about 40° C., about 30° C. to about 45° C., about 35° C. to about 40° C., about 35° C. to about 45° C., or about 40° C. to about 45° C., including increments therein.

In some embodiments, the lithium ion energy storage device is configured for discharging at temperatures of about 0° C. to about 65° C. In some embodiments, the lithium ion energy storage device is configured for discharging at temperatures of about 0° C. to about 5° C., about 0° C. to about 10° C., about 0° C. to about 15° C., about 0° C. to about 20° C., about 0° C. to about 25° C., about 0° C. to about 30° C., about 0° C. to about 40° C., about 0° C. to about 50° C., about 0° C. to about 65° C., about 5° C. to about 10° C., about 5° C. to about 15° C., about 5° C. to about 20° C., about 5° C. to about 25° C., about 5° C. to about 30° C., about 5° C. to about 40° C., about 5° C. to about 50° C., about 5° C. to about 65° C., about 10° C. to about 15° C., about 10° C. to about 20° C., about 10° C. to about 25° C., about 10° C. to about 30° C., about 10° C. to about 40° C., about 10° C. to about 50° C., about 10° C. to about 65° C., about 15° C. to about 20° C., about 15° C. to about 25° C., about 15° C. to about 30° C., about 15° C. to about 40° C., about 15° C. to about 50° C., about 15° C. to about 65° C., about 20° C. to about 25° C., about 20° C. to about 30° C., about 20° C. to about 40° C., about 20° C. to about 50° C., about 20° C. to about 65° C., about 25° C. to about 30° C., about 25° C. to about 40° C., about 25° C. to about 50° C., about 25° C. to about 65° C., about 30° C. to about 40° C., about 30° C. to about 50° C., about 30° C. to about 65° C., about 40° C. to about 50° C., about 40° C. to about 65° C., or about 50° C. to about 65° C., including increments therein.

In some embodiments, the lithium ion energy storage device is configured for storage at temperatures of about −20° C. to about 50° C. In some embodiments, the lithium ion energy storage device is configured for storage at temperatures of about −20° C. to about −10° C., about −20° C. to about 0° C., about −20° C. to about 10° C., about −20° C. to about 20° C., about −20° C. to about 30° C., about −20° C. to about 40° C., about −20° C. to about 50° C., about −10° C. to about 0° C., about −10° C. to about 10° C., about −10° C. to about 20° C., about −10° C. to about 30° C., about −10° C. to about 40° C., about −10° C. to about 50° C., about 0° C. to about 10° C., about 0° C. to about 20° C., about 0° C. to about 30° C., about 0° C. to about 40° C., about 0° C. to about 50° C., about 10° C. to about 20° C., about 10° C. to about 30° C., about 10° C. to about 40° C., about 10° C. to about 50° C., about 20° C. to about 30° C., about 20° C. to about 40° C., about 20° C. to about 50° C., about 30° C. to about 40° C., about 30° C. to about 50° C., or about 40° C. to about 50° C., including increments therein.

In some embodiments, the cathode has a specific capacity of at least about 50, 60, 70, 80, 90, 100, 110, 120, 130, 140, or 150 mAh/g. In some embodiments, the cathode has an areal capacity of at least about 1, 2, 3, 4, 5, or 6 mAh/cm$^2$. In some embodiments, the cathode has a loading mass of at least about 10, 15, 20, 25, 30, 35, or 40 mg/cm$^2$. In some embodiments, the cathode has a packing density from about 1 to about 5 g/cm$^3$, from about 2 to about 4 g/cm$^3$, or from about 3.0 and about 3.6 g/cm$^3$. In some embodiments, the cathode has a porosity suitable for charge and discharge. In some embodiments, the anode has a specific capacity of at least about 100, 150, 200, 250, 300, or 340 mAh/g. In some embodiments, the anode has an areal capacity of at least about 1, 2, 3, 4, 5, 6, or 7 mAh/cm$^2$. In some embodiments, the anode has a loading mass of at least about 5, 10, 15, or 20 mg/cm$^2$. In some embodiments, the anode has a packing density from about 0.5 to about 3 g/cm$^3$, from about 1 to about 3 g/cm$^3$, from about 1 to about 2 g/cm$^3$, or from about 1.5 to about 1.7 g/cm$^3$. In some embodiments, the packing density of the cathode of about 2.0 g/cm$^3$ to about 5 g/cm$^3$ enables a sufficient porosity for charging and discharging.

Methods of Forming Electrodes

Provided herein are methods of forming a mesocarbon microbead electrode. In some embodiments, the method comprises forming a mixture of mesocarbon microbeads (MCMB), carbon black, carboxymethyl cellulose (CMC), a hydrophilic binder, and water, and coating the mixture onto a substrate.

In some embodiments, the hydrophilic binder is a polymeric binder. In some embodiments, the hydrophilic binder comprises styrene butadiene rubber (SBR), polyvinylidene fluoride (PVDF), sodium alginate, polytetrafluoroethylene (PTFE), sodium carboxymethyl chitosan (CCTS), polyacrylic acid (PAA), polystyrene sulfonate (PSS), polyvinyl alcohol (PVA), poly(fluorene), polyphenylene, polypyrene, polyazulene, polynaphthalene, poly(acetylene), poly(p-phenylene vinylene), poly(pyrrole) (PPY), polycarbazole, polyindole, polyazepine, poly(thiophene)s (PT), poly(3,4-ethylenedioxythiophene) (PEDOT), poly(p-phenylene sulfide) (PPS), polyaniline (PANI), or any combination thereof. In some embodiments, the substrate is a copper foil, aluminum foil, nickel, a freestanding carbon sheet, graphite, graphene, carbon nanotubes, or any combination thereof. In some embodiments, the substrate comprises a pure metals. In some embodiments, the substrate is coated with a layer of carbon.

In some embodiments, the mixture comprises a w/w concentration of the MCMB of about 85% to about 99%. In some embodiments, the mixture comprises a w/w concentration of the MCMB of about 85% to about 87%, about 85% to about 89%, about 85% to about 91%, about 85% to about 93%, about 85% to about 95%, about 85% to about 97%, about 85% to about 99%, about 87% to about 89%, about 87% to about 91%, about 87% to about 93%, about 87% to about 95%, about 87% to about 97%, about 87% to about 99%, about 89% to about 91%, about 89% to about 93%, about 89% to about 95%, about 89% to about 97%, about 89% to about 99%, about 91% to about 93%, about 91% to about 95%, about 91% to about 97%, about 91% to about 99%, about 93% to about 95%, about 93% to about 97%, about 93% to about 99%, about 95% to about 97%, about 95% to about 99%, or about 97% to about 99%, including increments therein. In some embodiments, the mixture comprises a w/w concentration of the MCMB of about 85%, about 87%, about 89%, about 91%, about 93%, about 95%, about 97%, or about 99%. In some embodiments, the mixture comprises a w/w concentration of the MCMB of at least about 85%, about 87%, about 89%, about 91%, about 93%, about 95%, or about 97%. In some embodiments, the mixture comprises a w/w concentration of the MCMB of at most about 87%, about 89%, about 91%, about 93%, about 95%, about 97%, or about 99%.

In some embodiments, the mixture comprises a w/w concentration of the carbon black of about 2% to about 8%. In some embodiments, the mixture comprises a w/w concentration of the carbon black of about 2% to about 3%, about 2% to about 4%, about 2% to about 5%, about 2% to about 6%, about 2% to about 7%, about 2% to about 8%, about 3% to about 4%, about 3% to about 5%, about 3% to about 6%, about 3% to about 7%, about 3% to about 8%, about 4% to about 5%, about 4% to about 6%, about 4% to about 7%, about 4% to about 8%, about 5% to about 6%, about 5% to about 7%, about 5% to about 8%, about 6% to about 7%, about 6% to about 8%, or about 7% to about 8%, including increments therein. In some embodiments, the mixture comprises a w/w concentration of the carbon black of about 2%, about 3%, about 4%, about 5%, about 6%, about 7%, or about 8%. In some embodiments, the mixture comprises a w/w concentration of the carbon black of at least about 2%, about 3%, about 4%, about 5%, about 6%, or about 7%. In some embodiments, the mixture comprises a w/w concentration of the carbon black of at most about 3%, about 4%, about 5%, about 6%, about 7%, or about 8%.

In some embodiments, the mixture comprises a w/w concentration of the CMC of about 0.1% to about 0.8%. In some embodiments, the mixture comprises a w/w concentration of the CMC of about 0.1% to about 0.2%, about 0.1% to about 0.3%, about 0.1% to about 0.4%, about 0.1% to about 0.5%, about 0.1% to about 0.6%, about 0.1% to about 0.7%, about 0.1% to about 0.8%, about 0.2% to about 0.3%, about 0.2% to about 0.4%, about 0.2% to about 0.5%, about 0.2% to about 0.6%, about 0.2% to about 0.7%, about 0.2% to about 0.8%, about 0.3% to about 0.4%, about 0.3% to about 0.5%, about 0.3% to about 0.6%, about 0.3% to about 0.7%, about 0.3% to about 0.8%, about 0.4% to about 0.5%, about 0.4% to about 0.6%, about 0.4% to about 0.7%, about 0.4% to about 0.8%, about 0.5% to about 0.6%, about 0.5% to about 0.7%, about 0.5% to about 0.8%, about 0.6% to about 0.7%, about 0.6% to about 0.8%, or about 0.7% to about 0.8%, including increments therein. In some embodiments, the mixture comprises a w/w concentration of the CMC of about 0.1%, about 0.2%, about 0.3%, about 0.4%, about 0.5%, about 0.6%, about 0.7%, or about 0.8%. In some embodiments, the mixture comprises a w/w concentration of the CMC of at least about 0.1%, about 0.2%, about 0.3%, about 0.4%, about 0.5%, about 0.6%, or about 0.7%. In some embodiments, the mixture comprises a w/w concentration of the CMC of at most about 0.2%, about 0.3%, about 0.4%, about 0.5%, about 0.6%, about 0.7%, or about 0.8%.

In some embodiments, the mixture comprises a w/w concentration of the hydrophilic binder of about 1% to about 10%. In some embodiments, the mixture comprises a w/w concentration of the hydrophilic binder of about 1% to about 2%, about 1% to about 3%, about 1% to about 4%, about 1% to about 5%, about 1% to about 6%, about 1% to about 7% about 1% to about 8%, about 1% to about 9%, about 1% to about 10%, about 2% to about 3%, about 2% to about 4%, about 2% to about 5%, about 2% to about 6%, about 2% to about 7%, about 2% to about 8%, about 2% to about 9% about 2% to about 10%, about 3% to about 4%, about 3% to about 5%, about 3% to about 6%, about 3% to about 7%, about 3% to about 8%, about 3% to about 9%, about 3% to about 10%, about 4% to about 5%, about 4% to about 6%, about 4% to about 7%, about 4% to about 8%, about 4% to about 9% about 4% to about 10%, about 5% to about 6%, about 5% to about 7% about 5% to about 8%, about 5% to about 9% about 5% to about 10%, about 6% to about 7% about 6% to about 8%, about 6% to about 9% about 6% to about 10%, about 7% to about 8%, about 7% to about 9% about 7% to about 10%, about 8% to about 9%, about 8% to about 10%, or about 9% to about 10%, including increments therein. In some embodiments, the mixture comprises a w/w concentration of the hydrophilic binder of about 1%, about 2%, about 3%, about 4%, about 5%, about 6%, about 7%, about 8%, about 9%, or about 10%. In some embodiments, the mixture comprises a w/w concentration of the hydrophilic binder of at least about 1%, about 2%, about 3%, about 4%, about 5%, about 6%, about 7%, about 8%, or about 9%. In some embodiments, the mixture comprises a w/w concentration of the hydrophilic binder of at most about 2%, about 3%, about 4%, about 5%, about 6%, about 7%, about 8%, about 9%, or about 10%.

In some embodiments, the mixture has a viscosity when coated onto the substrate of about 1,000 mPa*s to about 2,000 mPa*s. In some embodiments, the mixture has a viscosity when coated onto the substrate of about 1,000 mPa*s to about 1,100 mPa*s, about 1,000 mPa*s to about 1,200 mPa*s, about 1,000 mPa*s to about 1,300 mPa*s, about 1,000 mPa*s to about 1,400 mPa*s, about 1,000 mPa*s to about 1,500 mPa*s, about 1,000 mPa*s to about 1,600 mPa*s, about 1,000 mPa*s to about 1,700 mPa*s, about 1,000 mPa*s to about 1,800 mPa*s, about 1,000 mPa*s to about 1,900 mPa*s, about 1,000 mPa*s to about 2,000 mPa*s, about 1,100 mPa*s to about 1,200 mPa*s, about 1,100 mPa*s to about 1,300 mPa*s, about 1,100 mPa*s to about 1,400 mPa*s, about 1,100 mPa*s to about 1,500 mPa*s, about 1,100 mPa*s to about 1,600 mPa*s, about 1,100 mPa*s to about 1,700 mPa*s, about 1,100 mPa*s to about 1,800 mPa*s, about 1,100 mPa*s to about 1,900 mPa*s, about 1,100 mPa*s to about 2,000 mPa*s, about 1,200 mPa*s to about 1,300 mPa*s, about 1,200 mPa*s to about 1,400 mPa*s, about 1,200 mPa*s to about 1,500 mPa*s, about 1,200 mPa*s to about 1,600 mPa*s, about 1,200 mPa*s to about 1,700 mPa*s, about 1,200 mPa*s to about 1,800 mPa*s, about 1,200 mPa*s to about 1,900 mPa*s, about 1,200 mPa*s to about 2,000 mPa*s, about 1,300 mPa*s to about 1,400 mPa*s, about 1,300 mPa*s to about 1,500 mPa*s, about 1,300 mPa*s to about 1,600 mPa*s, about 1,300 mPa*s to about 1,700 mPa*s, about 1,300 mPa*s to about 1,800 mPa*s, about 1,300 mPa*s to about 1,900 mPa*s, about 1,300 mPa*s to about 2,000 mPa*s, about 1,400 mPa*s to about 1,500 mPa*s, about 1,400 mPa*s to about 1,600 mPa*s, about 1,400 mPa*s to about 1,700 mPa*s, about 1,400 mPa*s to about 1,800 mPa*s, about 1,400 mPa*s to about 1,900 mPa*s, about 1,400 mPa*s to about 2,000 mPa*s, about 1,500 mPa*s to about 1,600 mPa*s, about 1,500 mPa*s to about 1,700 mPa*s, about 1,500 mPa*s to about 1,800 mPa*s, about 1,500 mPa*s to about 1,900 mPa*s, about 1,500 mPa*s to about 2,000 mPa*s, about 1,600 mPa*s to about 1,700 mPa*s, about 1,600 mPa*s to about 1,800 mPa*s, about 1,600 mPa*s to about 1,900 mPa*s, about 1,600 mPa*s to about 2,000 mPa*s, about 1,700 mPa*s to about 1,800 mPa*s, about 1,700 mPa*s to about 1,900 mPa*s, about 1,700 mPa*s to about 2,000 mPa*s, about 1,800 mPa*s to about 1,900 mPa*s, about 1,800 mPa*s to about 2,000 mPa*s, or about 1,900 mPa*s to about 2,000 mPa*s, including increments therein. In some embodiments, the mixture has a viscosity when coated onto the substrate of about 1,000 mPa*s, about 1,100 mPa*s, about 1,200 mPa*s, about 1,300 mPa*s, about 1,400 mPa*s, about 1,500 mPa*s, about 1,600 mPa*s, about 1,700 mPa*s, about 1,800 mPa*s, about 1,900 mPa*s, or about 2,000 mPa*s. In some embodiments, the mixture has a viscosity when coated onto the substrate of at least about 1,000 mPa*s, about 1,100 mPa*s, about 1,200 mPa*s, about 1,300 mPa*s, about 1,400 mPa*s, about 1,500 mPa*s, about 1,600 mPa*s, about 1,700 mPa*s, about 1,800 mPa*s, or about 1,900 mPa*s. In some embodiments, the mixture has a viscosity when coated onto the substrate of at most about 1,100 mPa*s, about 1,200 mPa*s, about 1,300 mPa*s, about 1,400 mPa*s, about 1,500 mPa*s, about 1,600 mPa*s, about 1,700 mPa*s, about 1,800 mPa*s, about 1,900 mPa*s, or about 2,000 mPa*s.

Another aspect provided herein is a method of forming a lithium cobalt oxide electrode. In some embodiments, the method comprises forming a mixture of lithium cobalt oxide (LCO), carbon black, a reduced graphene oxide dispersion, a hydrophilic binder, and a solvent, and coating the mixture onto a substrate.

In some embodiments, the hydrophilic binder comprises styrene butadiene rubber (SBR), polyvinylidene fluoride (PVDF), sodium alginate, polytetrafluoroethylene (PTFE), sodium carboxymethyl chitosan (CCTS), polyacrylic acid (PAA), polystyrene sulfonate (PSS), polyvinyl alcohol (PVA), poly(fluorene), polyphenylene, polypyrene, polyazulene, polynaphthalene, poly(acetylene), poly(p-phenylene vinylene), poly(pyrrole) (PPY), polycarbazole, polyindole, polyazepine, poly(thiophene)s (PT), poly(3,4-ethylenedioxythiophene) (PEDOT), poly(p-phenylene sulfide) (PPS), polyaniline (PANI), or any combination thereof. In some embodiments, the solvent comprises N-Methyl-2-pyrrolidone (NMP), water, dimethyl sulfoxide (DMSO), or any combination thereof. In some embodiments, at least a portion of the lithium cobalt oxide is in the form of a powder. In some embodiments, the substrate is a copper foil, aluminum foil, nickel, a freestanding carbon sheet, graphite, graphene, carbon nanotubes, or any combination thereof.

In some embodiments, the mixture comprises a w/w concentration of the MCMB of about 85% to about 99%. In some embodiments, the mixture comprises a w/w concentration of the MCMB of about 85% to about 87%, about 85% to about 89%, about 85% to about 91%, about 85% to about 93%, about 85% to about 95%, about 85% to about 97%, about 85% to about 99%, about 87% to about 89%, about 87% to about 91%, about 87% to about 93%, about 87% to about 95%, about 87% to about 97%, about 87% to about 99%, about 89% to about 91%, about 89% to about 93%, about 89% to about 95%, about 89% to about 97%, about 89% to about 99%, about 91% to about 93%, about 91% to about 95%, about 91% to about 97%, about 91% to about 99%, about 93% to about 95%, about 93% to about 97%, about 93% to about 99%, about 95% to about 97%, about 95% to about 99%, or about 97% to about 99%, including increments therein. In some embodiments, the mixture comprises a w/w concentration of the MCMB of about 85%, about 87%, about 89%, about 91%, about 93%, about 95%, about 97%, or about 99%. In some embodiments, the mixture comprises a w/w concentration of the MCMB of at least about 85%, about 87%, about 89%, about 91%, about 93%, about 95%, or about 97%. In some embodiments, the mixture comprises a w/w concentration of the MCMB of at most about 87%, about 89%, about 91%, about 93%, about 95%, about 97%, or about 99%.

In some embodiments, the mixture comprises a w/w concentration of the carbon black of about 2% to about 8%. In some embodiments, the mixture comprises a w/w concentration of the carbon black of about 2% to about 3%, about 2% to about 4%, about 2% to about 5%, about 2% to about 6%, about 2% to about 7%, about 2% to about 8%, about 3% to about 4%, about 3% to about 5%, about 3% to about 6%, about 3% to about 7%, about 3% to about 8%, about 4% to about 5%, about 4% to about 6%, about 4% to about 7%, about 4% to about 8%, about 5% to about 6%, about 5% to about 7%, about 5% to about 8%, about 6% to about 7%, about 6% to about 8%, or about 7% to about 8%, including increments therein. In some embodiments, the mixture comprises a w/w concentration of the carbon black of about 2%, about 3%, about 4%, about 5%, about 6%, about 7%, or about 8%. In some embodiments, the mixture comprises a w/w concentration of the carbon black of at least about 2%, about 3%, about 4%, about 5%, about 6%, or about 7%. In some embodiments, the mixture comprises a w/w concentration of the carbon black of at most about 3%, about 4%, about 5%, about 6%, about 7%, or about 8%.

In some embodiments, the mixture comprises a w/w concentration of the CMC of about 0.1% to about 0.8%. In some embodiments, the mixture comprises a w/w concentration of the CMC of about 0.1% to about 0.2%, about 0.1% to about 0.3%, about 0.1% to about 0.4%, about 0.1% to about 0.5%, about 0.1% to about 0.6%, about 0.1% to about 0.7%, about 0.1% to about 0.8%, about 0.2% to about 0.3%, about 0.2% to about 0.4%, about 0.2% to about 0.5%, about 0.2% to about 0.6%, about 0.2% to about 0.7%, about 0.2% to about 0.8%, about 0.3% to about 0.4%, about 0.3% to about 0.5%, about 0.3% to about 0.6%, about 0.3% to about 0.7%, about 0.3% to about 0.8%, about 0.4% to about 0.5%, about 0.4% to about 0.6%, about 0.4% to about 0.7%, about 0.4% to about 0.8%, about 0.5% to about 0.6%, about 0.5% to about 0.7%, about 0.5% to about 0.8%, about 0.6% to about 0.7%, about 0.6% to about 0.8%, or about 0.7% to about 0.8%, including increments therein. In some embodiments, the mixture comprises a w/w concentration of the CMC of about 0.1%, about 0.2%, about 0.3%, about 0.4%, about 0.5%, about 0.6%, about 0.7%, or about 0.8%. In some embodiments, the mixture comprises a w/w concentration of the CMC of at least about 0.1%, about 0.2%, about 0.3%, about 0.4%, about 0.5%, about 0.6%, or about 0.7%. In some embodiments, the mixture comprises a w/w concentration of the CMC of at most about 0.2%, about 0.3%, about 0.4%, about 0.5%, about 0.6%, about 0.7%, or about 0.8%.

In some embodiments, the mixture comprises a w/w concentration of the hydrophilic binder of about 1% to about 10%. In some embodiments, the mixture comprises a w/w concentration of the hydrophilic binder of about 1% to about 2%, about 1% to about 3%, about 1% to about 4%, about 1% to about 5% about 1% to about 6%, about 1% to about 7%, about 1% to about 8%, about 1% to about 9%, about 1% to about 10%, about 2% to about 3%, about 2% to about 4%. about 2% to about 5% about 2% to about 6%, about 2% to about 7%, about 2% to about 8%, about 2% to about 9%, about 2% to about 10%, about 3% to about 4%, about 3% to about 5%, about 3% to about 6%, about 3% to about 7%, about 3% to about 8%, about 3% to about 9%, about 3% to about 10%, about 4% to about 5%, about 4% to about 6%, about 4% to about 7%, about 4% to about 8%, about 4% to about 9% about 4% to about 10%, about 5% to about 6%, about 5% to about 7% about 5% to about 8%, about 5% to about 9%, about 5% to about 10%, about 6% to about 7%, about 6% to about 8%, about 6% to about 9%, about 6% to about 10%, about 7% to about 8%, about 7% to about 9% about 7% to about 10%, about 8% to about 9%, about 8% to about 10%, or about 9% to about 10%, including increments therein. In some embodiments, the mixture comprises a w/w concentration of the hydrophilic binder of about 1%, about 2%, about 3%, about 4%, about 5%, about 6%, about 7%, about 8%, about 9%, or about 10%. In some embodiments, the mixture comprises a w/w concentration of the hydrophilic binder of at least about 1%, about 2%, about 3%, about 4%, about 5%, about 6%, about 7%, about 8%, or about 9%. In some embodiments, the mixture comprises a w/w concentration of the hydrophilic binder of at most about 2%, about 3%, about 4%, about 5%, about 6%, about 7%, about 8%, about 9%, or about 10%.

In some embodiments, the mixture has a viscosity when coated onto the substrate of about 1,000 mPa*s to about 2,000 mPa*s. In some embodiments, the mixture has a viscosity when coated onto the substrate of about 1,000 mPa*s to about 1,100 mPa*s, about 1,000 mPa*s to about 1,200 mPa*s, about 1,000 mPa*s to about 1,300 mPa*s, about 1,000 mPa*s to about 1,400 mPa*s, about 1,000 mPa*s to about 1,500 mPa*s, about 1,000 mPa*s to about 1,600 mPa*s, about 1,000 mPa*s to about 1,700 mPa*s, about 1,000 mPa*s to about 1,800 mPa*s, about 1,000 mPa*s to about 1,900 mPa*s, about 1,000 mPa*s to about 2,000 mPa*s, about 1,100 mPa*s to about 1,200 mPa*s, about 1,100 mPa*s to about 1,300 mPa*s, about 1,100 mPa*s to about 1,400 mPa*s, about 1,100 mPa*s to about 1,500 mPa*s, about 1,100 mPa*s to about 1,600 mPa*s, about 1,100 mPa*s to about 1,700 mPa*s, about 1,100 mPa*s to about 1,800 mPa*s, about 1,100 mPa*s to about 1,900 mPa*s, about 1,100 mPa*s to about 2,000 mPa*s, about 1,200 mPa*s to about 1,300 mPa*s, about 1,200 mPa*s to about 1,400 mPa*s, about 1,200 mPa*s to about 1,500 mPa*s, about 1,200 mPa*s to about 1,600 mPa*s, about 1,200 mPa*s to about 1,700 mPa*s, about 1,200 mPa*s to about 1,800 mPa*s, about 1,200 mPa*s to about 1,900 mPa*s, about 1,200 mPa*s to about 2,000 mPa*s, about 1,300 mPa*s to about 1,400 mPa*s, about 1,300 mPa*s to about 1,500 mPa*s, about 1,300 mPa*s to about 1,600 mPa*s, about 1,300 mPa*s to about 1,700 mPa*s, about 1,300 mPa*s to about 1,800 mPa*s, about 1,300 mPa*s to about 1,900 mPa*s, about 1,300 mPa*s to about 2,000 mPa*s, about 1,400 mPa*s to about 1,500 mPa*s, about 1,400 mPa*s to about 1,600 mPa*s, about 1,400 mPa*s to about 1,700 mPa*s, about 1,400 mPa*s to about 1,800 mPa*s, about 1,400 mPa*s to about 1,900 mPa*s, about 1,400 mPa*s to about 2,000 mPa*s, about 1,500 mPa*s to about 1,600 mPa*s, about 1,500 mPa*s to about 1,700 mPa*s, about 1,500 mPa*s to about 1,800 mPa*s, about 1,500 mPa*s to about 1,900 mPa*s, about 1,500 mPa*s to about 2,000 mPa*s, about 1,600 mPa*s to about 1,700 mPa*s, about 1,600 mPa*s to about 1,800 mPa*s, about 1,600 mPa*s to about 1,900 mPa*s, about 1,600 mPa*s to about 2,000 mPa*s, about 1,700 mPa*s to about 1,800 mPa*s, about 1,700 mPa*s to about 1,900 mPa*s, about 1,700 mPa*s to about 2,000 mPa*s, about 1,800 mPa*s to about 1,900 mPa*s, about 1,800 mPa*s to about 2,000 mPa*s, or about 1,900 mPa*s to about 2,000 mPa*s, including increments therein. In some embodiments, the mixture has a viscosity when coated onto the substrate of about 1,000 mPa*s, about 1,100 mPa*s, about 1,200 mPa*s, about 1,300 mPa*s, about 1,400 mPa*s, about 1,500 mPa*s, about 1,600 mPa*s, about 1,700 mPa*s, about 1,800 mPa*s, about 1,900 mPa*s, or about 2,000 mPa*s. In some embodiments, the mixture has a viscosity when coated onto the substrate of at least about 1,000 mPa*s, about 1,100 mPa*s, about 1,200 mPa*s, about 1,300 mPa*s, about 1,400 mPa*s, about 1,500 mPa*s, about 1,600 mPa*s, about 1,700 mPa*s, about 1,800 mPa*s, or about 1,900 mPa*s. In some embodiments, the mixture has a viscosity when coated onto the substrate of at most about 1,100 mPa*s, about 1,200 mPa*s, about 1,300 mPa*s, about 1,400 mPa*s, about 1,500 mPa*s, about 1,600 mPa*s, about 1,700 mPa*s, about 1,800 mPa*s, about 1,900 mPa*s, or about 2,000 mPa*s.

Energy Storage Device Characterization

In some embodiments, the lithium ion energy storage device has high thermal stability. In some embodiments, a discharge capacity of the lithium ion energy storage device decreases by at most about 30%, 28%, 26%, 24%, 22%, or 20% between operation at a temperature of about 0° C. and about −20° C. In some embodiments, a discharge capacity of the lithium ion energy storage device decreases by at most about 10%, 9%, 8%, 7%, 6%, 5%, 4%, or 3% between operation at a temperature of about 20° C. and about 0° C. In some embodiments, the lithium ion energy storage device is configured for charging at temperatures of about 0° C. to about 45° C. In some embodiments, the lithium ion energy storage device is configured for discharging at temperatures of about 0° C. to about 65° C. In some embodiments, the lithium ion energy storage device is configured for storage at temperatures of about −20° C. to about 50° C.

In some embodiments, the lithium ion energy storage device is configured to not explode during a nail penetration test simulating an internal short circuit. A nail penetration test is a well-known standard technique for testing battery safety. In some embodiments, the lithium ion energy storage device is configured to pass a nail penetration test. In some embodiments, an energy storage device passes the nail penetration test if it does not explode or ignite upon being pierced by a nail. In some embodiments, the nail penetration test is performed with a stroke distance of about 100 mm to about 500 mm. In some embodiments, the nail penetration test is performed with a load of about 5 kN to about 40 kN In some embodiments, the nail penetration test is performed with a speed of about 0.01 mm/minute to about 1,000 mm/minute.

FIG. 1 shows a voltage-current-capacity graph for an exemplary LCO energy storage device. In some embodiments, the lithium ion energy storage device has a nominal voltage of at least about 2.5, 2.6, 2.7, 2.8, 2.9, 3.0, 3.1, 3.2, 3.3, 3.4, 3.5, 3.6, 3.7, or 3.8 V.

Figure 2:
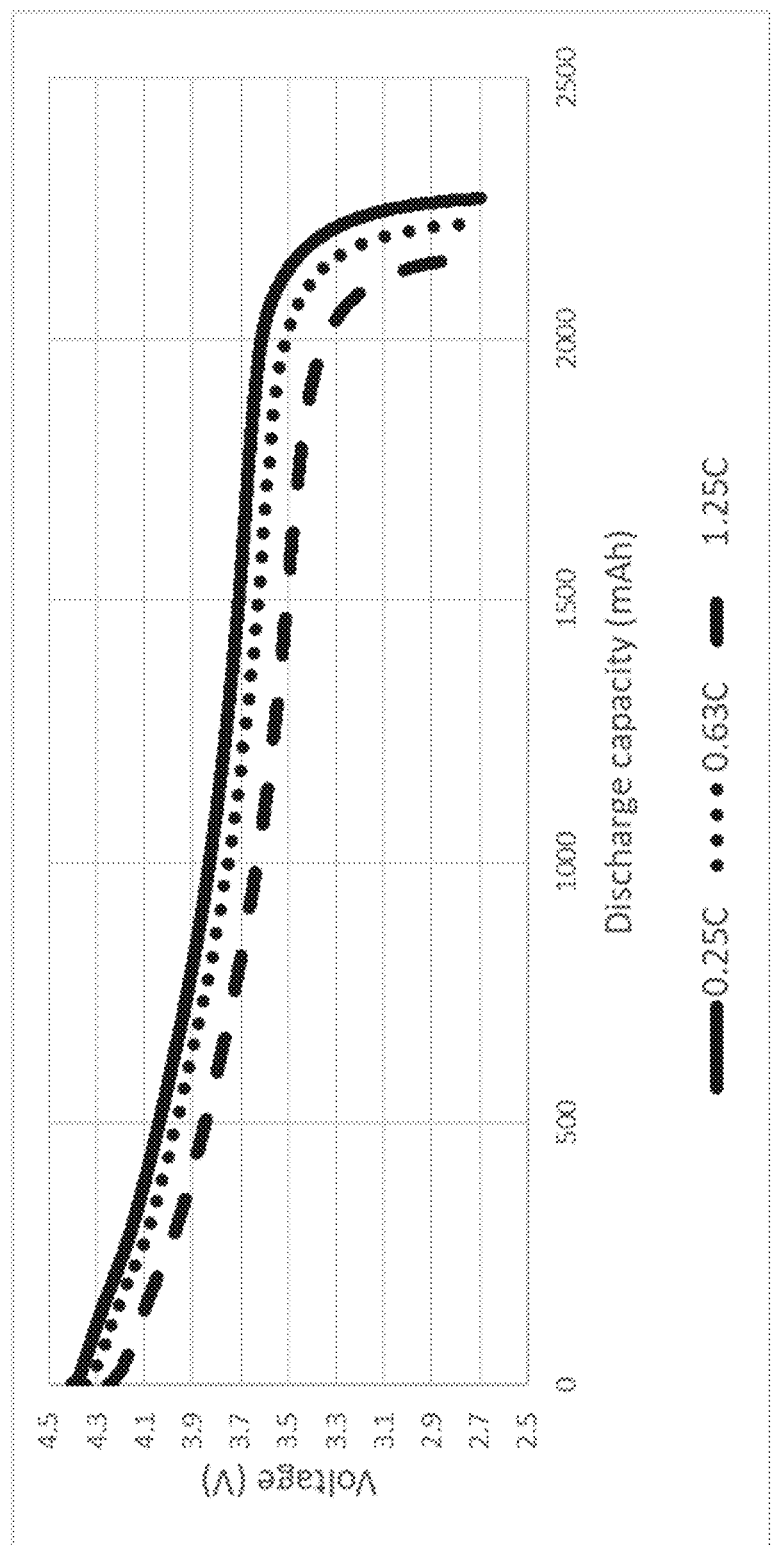
FIG. 2 shows a graph of voltage per discharge capacity at different rates for an exemplary LCO energy storage device, per an embodiment herein.

FIG. 2 shows a graph of voltage per discharge capacity at different rates for an exemplary LCO energy storage device. In some embodiments, the lithium ion energy storage device has a rate capacity of at least about 1500, 1600, 1700, 1800, 1900, 2000, 2100, 2200, or 2400 mAh. In some embodiments, the lithium ion energy storage device has a capacity of at least about 2000, 2100, 2200, 2400, 2500, 2600, 2700, or 2800 mAh.

Figure 3:
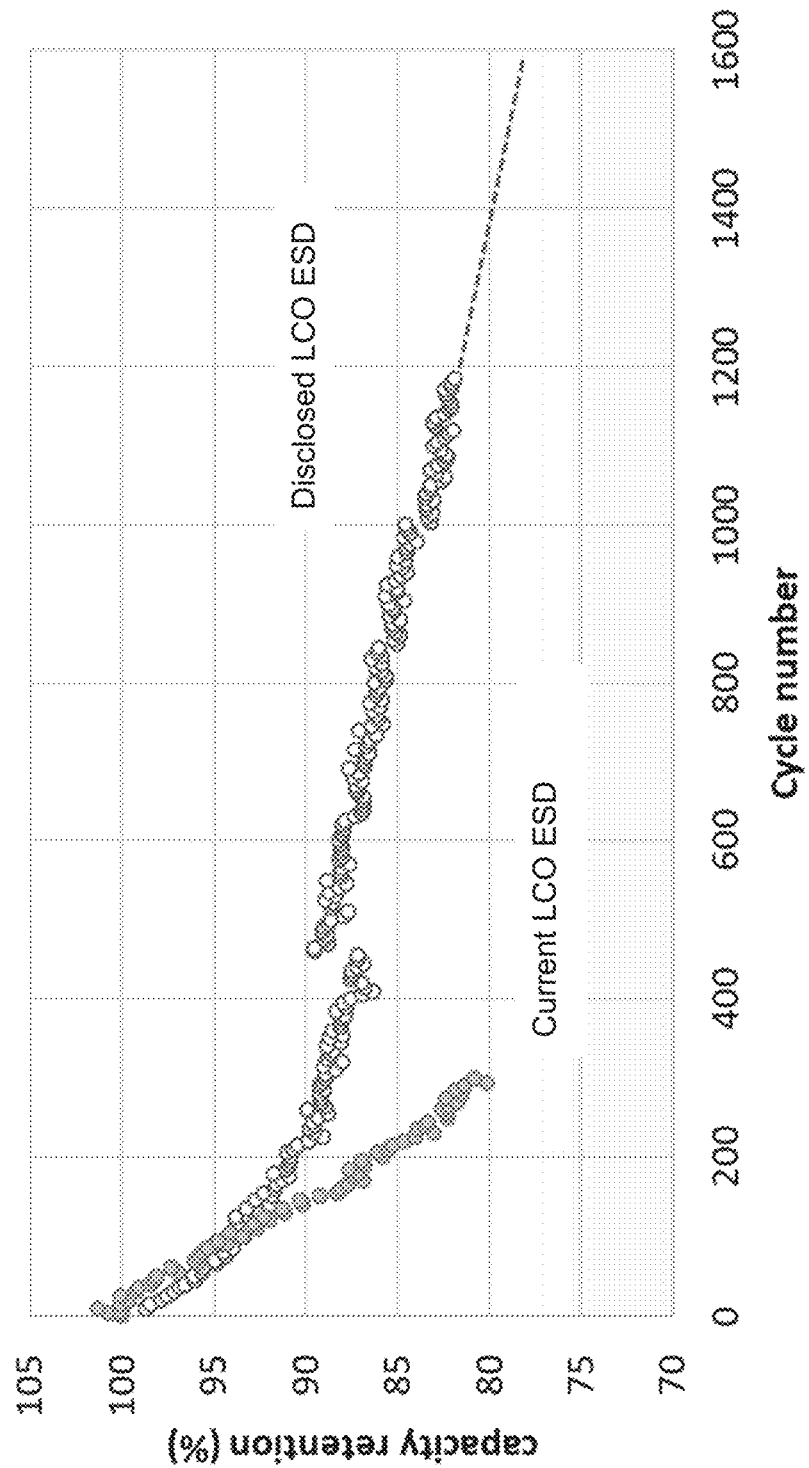
FIG. 3 shows a cycle number per capacity retention graph for the disclosed LCO energy storage device and a currently available LCO energy storage device, per an embodiment herein.

FIG. 3 shows a cycle number per capacity retention graph for the disclosed LCO energy storage device and a currently available LCO energy storage device. While the capacity of currently available LCO energy storage devices drops to about 80% cutoff within 300 cycles, some embodiments of the LCO energy storage devices disclosed herein maintain about 83.5% of the initial capacity after 640 cycles. In some embodiments, the lithium ion energy storage device retains at least about 60%, 65%, 70%, 75%, 80%, 85%, or 90% capacity after at least about 650, 700, 750, 800, 850, 900, 950, 1000, 1200, 1300, or 1400 cycles.

Figure 4:
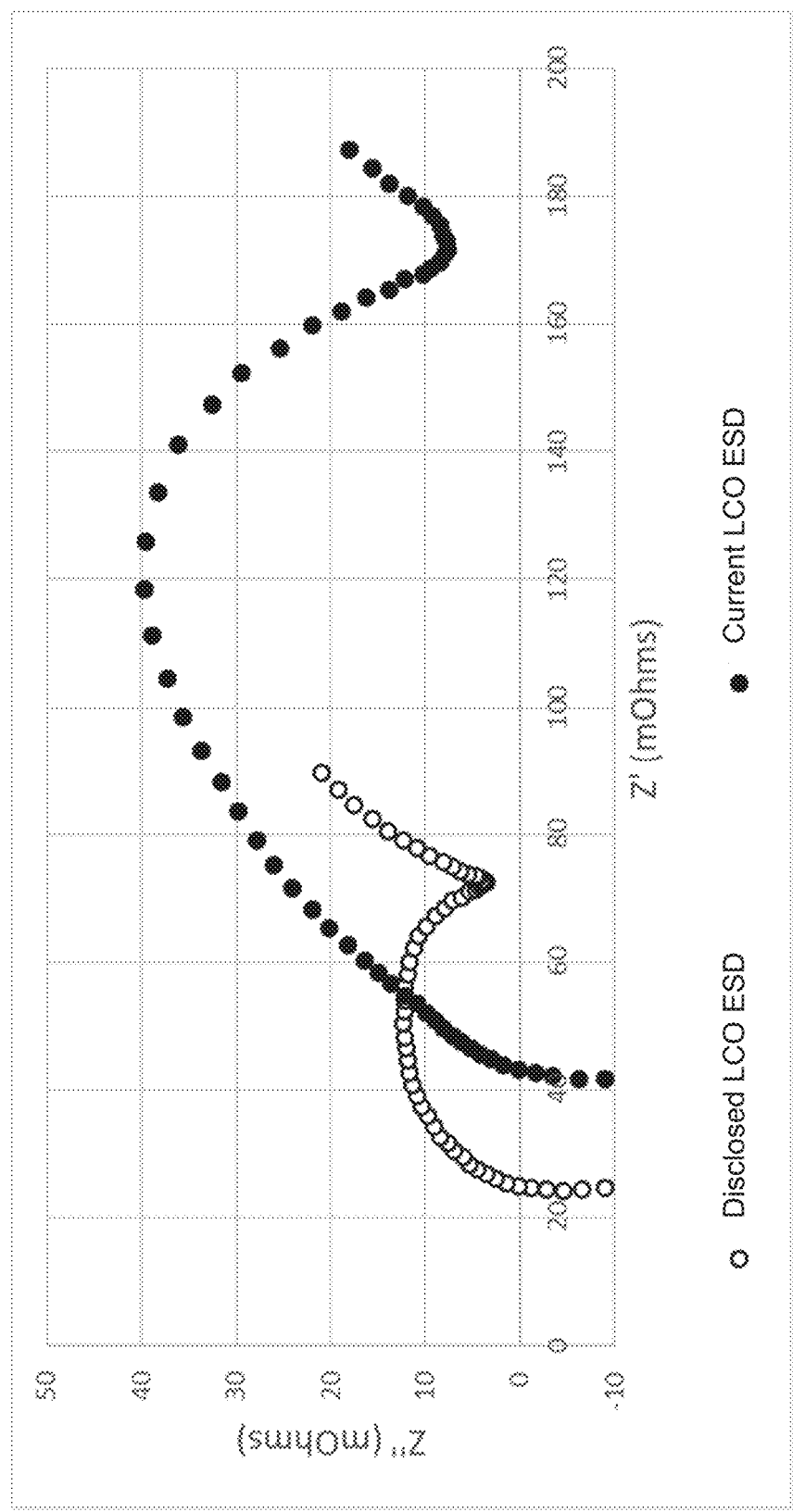
FIG. 4 shows a charge-discharge graph for the disclosed LCO energy storage device and a currently available LCO energy storage device, per an embodiment herein.

FIG. 4 shows a charge-discharge graph for the novel LCO energy storage device disclosed herein and a conventional LCO energy storage device. As shown the LCO energy storage device provided herein exhibit enhanced impedance characteristics, faster ion transport characteristics, lower charge transfer resistance, and a higher power density than a traditional LCO battery.

Figure 5:
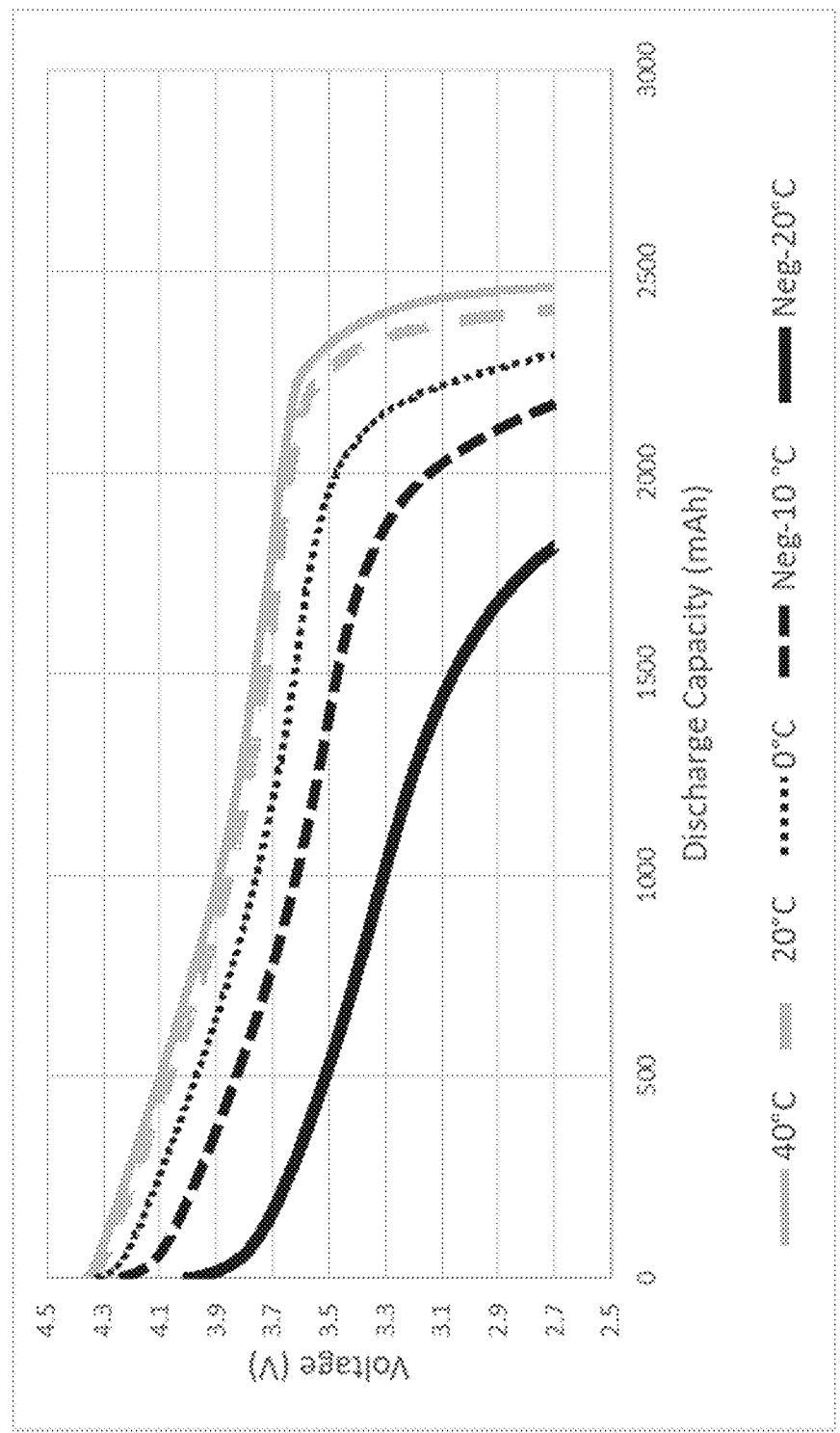
FIG. 5 shows a discharge capacity per voltage graph for an exemplary LCO energy storage device at different temperatures, per an embodiment herein.

FIG. 5 shows a discharge capacity per voltage graph for an exemplary LCO energy storage device at different temperatures. As shown there, the LCO energy storage device can be used over a wide temperature range between −20° C. to +40° C. By contrast, currently available LCO energy storage devices only work at temperatures above 20° C., excluding or diminishing their use from cold weather operation.

Figure 6A:
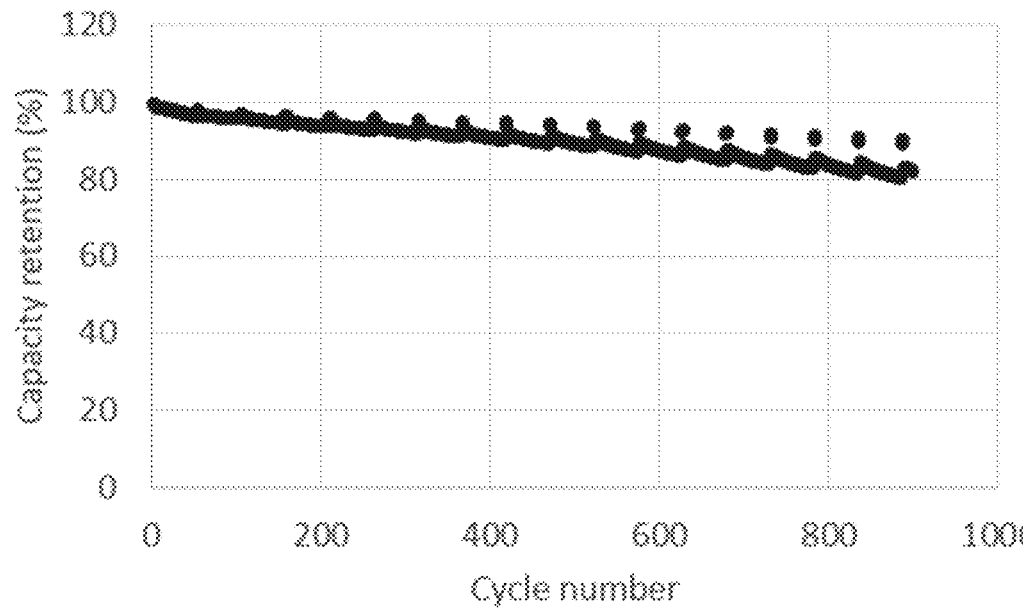
FIG. 6A shows a capacity retention percentage per cycle chart for an exemplary LCO energy storage device, per an embodiment herein.
Figure 6B:
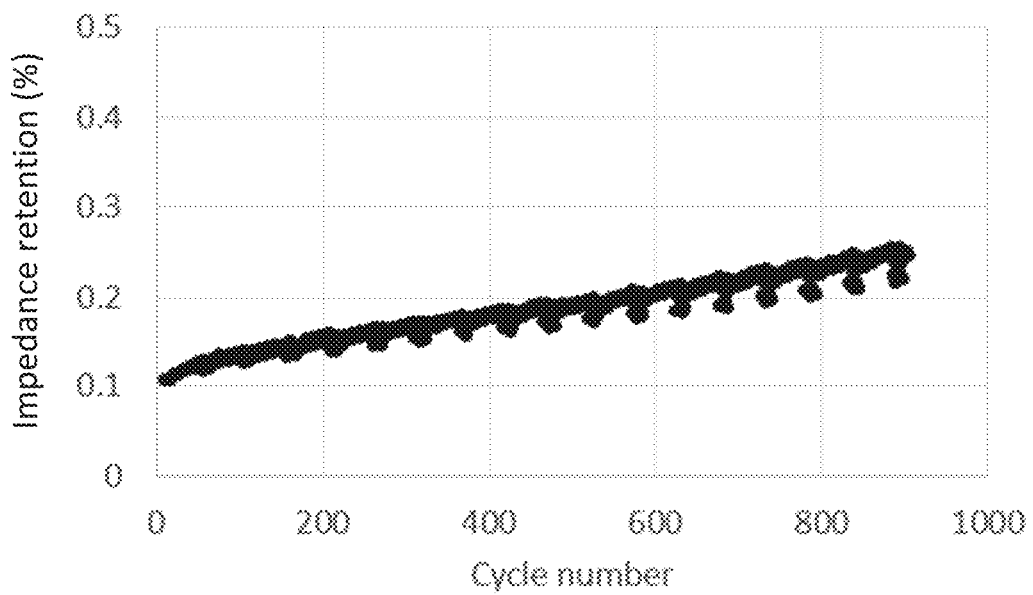
FIG. 6B shows an impedance retention percentage per cycle chart for an exemplary LCO energy storage device, per an embodiment herein.

FIGS. 6A and 6B show capacity retention percentages and impedance retention percentages, respectively, per cycle from 2.8 V to 4.2 V for an exemplary LCO energy storage device, performed with a C/5 CCCV charge protocol and a C/2 discharge protocol at a temperature of about 40° C. As shown, the exemplary LCO energy storage device retains its performance after 900 cycles with high stability.

In some embodiments, the lithium ion energy storage device has an internal resistance of at most about 26, 30, 40, 50, 60, 70, 80, 90, or 100 mΩ. In some embodiments, the lithium ion energy storage device has an energy density of at least about 100, 110, 120, 130, 140, 150, 160, 170, 180, 190, 200, or 210 Wh/kg. In some embodiments, the lithium ion energy storage device has an energy density of at least about 300, 350, 400, 450, 500, or 550 Wh/L.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "w/w" refers to a dry weight by weight ratio.

As used herein, the term "flammable" refers to substance that can be ignited, causing fire or combustion an explosion. In some embodiments, a flammable material is classified under the U.S. government's Hazardous Materials Identification System (HMIS) as rating 1 (materials that must be preheated before they ignite), rating 2 (materials that must be moderately heated or exposed to relatively high ambient temperatures before they ignite), rating 3 (materials that can ignite under almost all temperature conditions, or rating 4 (materials that rapidly vaporize at atmospheric pressure and normal temperatures, or readily disperse in air and burn readily natural).

As used herein, the term "non-flammable" refers to a substance that cannot be ignited, or that can only be ignited under certain conditions. In some embodiments, a flammable material is classified under the U.S. government's Hazardous Materials Identification System (HMIS) as rating 0 (materials that do not burn), rating 1 (materials that must be preheated before they ignite), or rating 2 (materials that must be moderately heated or exposed to relatively high ambient temperatures before they ignite).

EXAMPLES

The following illustrative examples are representative of embodiments of the software applications, systems, and methods described herein and are not meant to be limiting in any way.

Example 1—Method for Forming a Sparged LCO Electrolyte

In one example, 116.62 grams of g-butyrolactone (GBl) is poured into a clean flask that has been thoroughly washed and baked in an oven overnight to remove all moisture. 5 grams of VC, 5 grams of LiBOB, and 15 grams of $LiBF_4$ are added to the flask along with a stir bar. The flask is then capped with a septum and allowed to stir overnight. The following day 49.98 grams of FEP is added to the flask and allowed to stir for at least an hour before sparging. A long cannula attached to an argon line is then inserted through the septum down to the bottom of the flask along with a venting needle that remains in the headspace. While the flask continues to stir, argon is passed through the solution for an hour so that constant bubbling is observed. The cannula and needle are then removed and the solution again is allowed to stir overnight before shipping.

Example 2—Method for Forming a Non-Sparged LCO Electrolyte

In one example, separate solutions of g-butyrolactone (GBl), FEP, and VC are placed in separate Schlenk flasks that have been thoroughly washed and baked. The flasks are then closed and attached to a Schlenk line and placed in liquid nitrogen until entirely frozen. Once frozen, the vacuum port of the Schlenk line is opened up to one flask until the pressure gauge reads <150 mmHg, that flask is then closed and placed in a bath of warm water to thaw while the port to the next flask is opened. Once all flasks have thawed they are then refrozen and the process is repeated twice more. The pressure is allowed to reach <100 mm Hg and <75 mm Hg on all flasks and on the second and third cycles respectively. Once all flasks are thawed a third time they are dried with a kim wipe and placed in the antechamber of a glove box containing <20 ppm O2 along with a clean flask and sufficient amounts of LiBOB and LiBF$_4$ for at least 12 hours. Once inside the glove box, 15 grams of LiBF$_4$, 5 g of LiBOB, and 5 grams of VC are added to 166.62 grams of GBl and allowed to stir overnight. The following day 49.98 grams of FEP is added to the solution and is again allowed to stir overnight.

Example 3—Method for Forming an NCA Electrolyte

In one example, separate solutions of g-butyrolactone (GB1), FEP, and VC are placed in separate Schlenk flasks that have been thoroughly washed and baked. The flasks are then closed and attached to a Schlenk line and placed in liquid nitrogen until entirely frozen. Once frozen, the vacuum port of the Schlenk line is opened up to one flask until the pressure gauge reads <150 mmHg, that flask is then closed and placed in a bath of warm water to thaw while the port to the next flask is opened. Once all flasks have thawed they are then refrozen and the process is repeated twice more. The pressure is allowed to reach <100 mm Hg and <75 mm Hg on all flasks and on the second and third cycles respectively. Once all flasks are thawed a third time they are dried with a kim wipe and placed in the antechamber of a glove box containing <20 ppm O2 along with a clean flask and sufficient amounts of LiBOB and LiBF$_4$ for at least 12 hours. Once inside the glove box, 15 grams of LiBF$_4$, 5 g of LiBOB, and 5 grams of VC are added to 120 grams of GBl and allowed to stir overnight. The following day 52 grams of FEP is added to the solution and is again allowed to stir overnight.

Example 4—Method for Forming MesoCarbon MicroBead Electrode Slurry

A slurry of 1870 grams of MCMB graphite, 70 grams of carbon C45, 353 grams of hydrophilic binder, and a CMC binder is prepared. The mix speed is set at 5 m/s and a pump speed is set at 30 Hz. The mixing speed is increased or decreased to keep the viscosity of the slurry at around 1,200 mPa*s, and a vacuum is applied for 20 minutes.

A copper roll is inserted onto the unwinding roller, whereafter the copper is fed through the coating machine's rollers and attached to a roll core on a winding roller. The roll core is aligned on the winding roller at 8.5 cm from edge of machine to inside edge of roll core. A substrate is attached to the copper roll at 9.6 cm from the edge of machine and inside edge of substrate. An Edge Position Control (EPC) sensor is then set to around 2100, a coating rate is set to 300 mm/min, and the pressure roller, Auto Run, and Alignment features are engaged. The Slurry Container Valve is opened and the feed pump is turned on at a rate of 100 rpm to deposit the slurry onto the substrate, whereafter a slot die is engaged and a feeler gauge is used to set a gap of about 190 um from the Coating Roller. The feed pump rate can be increased or decreased to achieve a certain loading mass, thickness or both.

Example 6—18650 Form Factor LCO Energy Storage Device

An energy storage device is prepared that includes a LCO cathode, MCMB anode, and gamma-butyrolactone electrolyte according to the 18650 form factor. The specifications of the device was determined as shown in Table 1.

TABLE 1

| 18650 Form Factor LCO Energy Storage Device specifications | |
|---|---|
| Min. Rate Capacity | 2300 mAh |
| Typical Rate Capacity | 2400 mAh |
| Max. Rate Capacity | 2800 mAh |
| Nominal Voltage | 3.8 V |
| Internal resistance (@ 1000 Hz) | 26 milliohms |
| Weight | 40 g |
| Cycling life | >650 cycles for 83% cut off |
| | >800 cycles for 80% cut off |
| Charge Temperature | 0-45 C. |
| Discharge Temperature | 0-65 C. |
| Storage Temperature | −20 C.-+50 C. |
| Gravimetric Energy Density | 210 Wh/kg |
| Gravimetric Energy Density | 550 Wh/L |

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A lithium ion energy storage device comprising:
 a) a cathode;
 b) an anode; and
 c) a fire-resistant electrolyte comprising:
  i) about 30% to about 90% w/w gamma-butyrolactone;
  ii) about 5% to about 50% w/w 1,1,2,2-Tetrafluoroethyl-2,2,3,3-tetrafluoropropyl ether (FEP);
  iii) about 0.1% to about 10% w/w lithium bis(oxalato) borate (LiBOB); and
  iv) about 1% to about 20% w/w lithium tetrafluoroborate (LiBF$_4$).

2. The lithium ion energy storage device of claim 1, wherein the fire-resistant electrolyte further comprises valerolactone.

3. The lithium ion energy storage device of claim 2, wherein the fire-resistant electrolyte further comprises α-methyl-γ-butyrolactone, α-bromo-γ-butyrolactone, delta-valerolactone, or any combination thereof.

4. The lithium ion energy storage device of claim 2, wherein the valerolactone is gamma-valerolactone.

5. The lithium ion energy storage device of claim 2, wherein the fire-resistant electrolyte further comprises 1,3-Dioxol-2-one (VC).

6. The lithium ion energy storage device of claim 5, wherein the fire-resistant electrolyte comprises about 40% to about 80% w/w gamma-butyrolactone.

7. The lithium ion energy storage device of claim 6, wherein the fire-resistant electrolyte comprises about 1% to about 8% w/w lithium bis(oxalato)borate (LiBOB).

8. The lithium ion energy storage device of claim 7, wherein the fire-resistant electrolyte comprises about 3% to about 16% w/w lithium tetrafluoroborate (LiBF$_4$).

9. The lithium ion energy storage device of claim 8, wherein the fire-resistant electrolyte comprises about 0.1% to about 10% w/w 1,3-Dioxol-2-one (VC).

10. The lithium ion energy storage device of claim 9, wherein the energy storage device is configured for operation at temperatures from about −20° C. to about 40° C., and wherein the energy storage device is configured to retain at least 80% of its capacity after about 800 cycles.

11. The lithium ion energy storage device of claim 9, wherein the device is configured for a charge temperature range from about 0° C. to about 45° C., a discharge temperature range from about 0° C. to about 65° C., and a storage temperature range from about −20° C. to about 50° C.

12. The lithium ion energy storage device of claim 9, wherein the device comprises an energy density of about 210 Wh/kg, and an internal resistance not exceeding 26 milliohms.

13. The lithium ion energy storage device of claim 1, wherein the cathode comprises lithium cobalt oxide.

14. The lithium ion energy storage device of claim 13, wherein the cathode comprises one or more of 70% to 99% w/w lithium cobalt oxide, about 0.5% to about 5% w/w polyvinylidine fluoride (PVDF), about 0.1% to about 5% w/w carbon black, or about 0.001% to about 5% w/w graphene.

15. The lithium ion energy storage device of claim 14, wherein the graphene comprises a reduced graphene oxide dispersion.

16. The lithium ion energy storage device of claim 1, wherein the cathode is a nickel:cobalt:manganese cathode.

17. The lithium ion energy storage device of claim 16, wherein the cathode comprises Ni:Co:Mn at a ratio of about 5:2:3.

18. The lithium ion energy storage device of claim 16, wherein the lithium ion energy storage device is configured as an electric vehicle battery.

19. The lithium ion energy storage device of claim 1, wherein the cathode is a lithium nickel cobalt aluminum oxide (NCA) cathode.

20. The lithium ion energy storage device of claim 1, wherein the lithium ion energy storage device is configured to pass a nail penetration test.

* * * * *